United States Patent [19]

Sircar

[11] Patent Number: 5,026,482

[45] Date of Patent: Jun. 25, 1991

[54] SEPARATION OF LIQUID MIXTURES BY CONCENTRATION SWING ADSORPTION

[75] Inventor: Shivaji Sircar, Wescosville, Pa.

[73] Assignee: Air Products and Chemicals, Inc., Allentown, Pa.

[21] Appl. No.: 412,961

[22] Filed: Sep. 26, 1989

[51] Int. Cl.$^5$ .............................................. B01D 15/00
[52] U.S. Cl. ................................ 210/674; 208/310 R; 208/310 Z; 585/823; 585/821; 585/826; 210/660; 210/670
[58] Field of Search ................ 585/820, 826, 830, 821, 585/823, 824; 208/310 R, 310 Z; 210/660, 670, 674

[56] References Cited

U.S. PATENT DOCUMENTS

| | | | |
|---|---|---|---|
| 2,882,243 | 4/1959 | Milton | 55/75 X |
| 3,037,338 | 6/1962 | Thomas | 208/310 R |
| 3,150,079 | 9/1964 | Berlin | 585/827 X |
| 3,274,099 | 9/1966 | Broughton | 585/826 X |
| 3,365,394 | 1/1968 | Cottle | 585/821 X |
| 3,636,121 | 1/1972 | Stine et al. | 269/674 SA |
| 3,700,589 | 10/1972 | Symoniak et al. | 585/826 X |
| 3,843,514 | 10/1974 | Edwards | 585/820 X |
| 4,024,331 | 5/1977 | Neuzil et al. | 536/1 |
| 4,176,053 | 11/1979 | Holcombe | 585/822 X |
| 4,306,107 | 12/1981 | Broughton | 585/828 |
| 4,382,001 | 5/1983 | Kulprathipanja et al. | 585/820 X |

*Primary Examiner*—Curtis R. Davis
*Assistant Examiner*—William C. Diemler
*Attorney, Agent, or Firm*—Keith D. Gourley; James C. Simmons; William F. Marsh

[57] ABSTRACT

The present invention is a concentration swing adsorption process for separating a liquid phase feedstock comprising a more adsorbable component (A) and a less adsorbable component (B) with respect to an adsorbent. The process is operated in a system comprising a single or a plurality of adsorption columns containing the adsorbent which are operated in cycle in a predetermined sequence. The following operational steps are performed in the order recited in each of the adsorption columns in its turn. Feedstock is passed through the adsorbent and the more adsorbable component (A) is selectively adsorbed while a stream enriched in component (B) is discharged from the adsorption column. The adsorbent is rinsed in a direction co-current to the feedstock with the more adsorbable component (A) whereby the less adsorbable component (B) is displaced from the adsorbent and a stream comprising a mixture of the more adsorbable component (A) and the less adsorbable component (B) is withdrawn from the adsorption column. The adsorbent is rinsed with a liquid desorbent (D) whereby the more adsorbable component (A) and the less adsorbable component (B) are displaced from the adsorbent and a stream comprising the more adsorbable component (A) is withdrawn from the adsorbent bed. Mixtures containing the desorbent (D) and either component (A) or component (B) are easily separable by simple distillation and the separated desorbent (D) is recycled. The invention provides an energy efficient process for separating mixtures containing an azeotrope, close-boiling components or temperature-sensitive components which are very difficult to separate using conventional techniques.

18 Claims, 9 Drawing Sheets

A>D>B

○ WATER (1) + MONOETHANOLAMINE (2)
● WATER (2) + ETHYLENE DIAMINE (2)

A>B, C≧D

SEPARATION OF LIQUID MIXTURES BY CONCENTRATION SWING ADSORPTION

TECHNICAL FIELD

The present invention relates to the separation and recovery of individual components of a liquid mixture by selective adsorption utilizing one or more beds of adsorbent.

BACKGROUND OF THE INVENTION

Separation of liquid mixtures by distillation is a common chemical engineering operation. Distillation is most effective when the components of the liquid mixture have relative volatilities greater than about 1.5 to 2.0 in the entire compositional range of the mixture. However, when the components of the liquid mixture are close boiling, having relative volatilities of less than 1.5, separation by distillation becomes difficult, requiring a large energy expenditure and use of distillation columns having a large number of distillation trays.

Conventional distillation processes cannot be utilized if a liquid mixture forms an azeotrope or contains temperature sensitive components. Special distillation techniques such as azeotropic or extractive distillation, use of very high reflux ratios and vacuum distillation are typically used to separate these liquid mixtures. In some cases, fractional crystallization is required to effect separation. However, such operations are highly capital and energy intensive.

The limitations of conventional distillation techniques are particularly apparent when the liquid mixture forms an azeotrope (relative volatility being 1.0) at some relative composition of the mixture. Moreover, distillation cannot be used to separate components of a liquid mixture when the individual components cannot be heated above a certain temperature because of thermal degradation or reaction between the components. While vacuum distillation can be utilized, such a process significantly increases the energy expenditure and requires a large number of distillation trays to effect separation. Consequently, a need exists for an energy efficient process for separating liquid mixtures which contain close boiling components, while form azeotropes, which comprise a temperature sensitive component or the like.

U.S. Pat. No. 3,636,121 discloses a process for the selective adsorption of certain $C_8$ aromatic isomers from a liquid mixture to produce individually concentrated streams of the individual $C_8$ aromatic isomers while isomerizing a portion of the $C_8$ aromatic stream to effect the additional production of a given $C_8$ aromatic isomer. A first adsorption zone separates para-xylene and ethylbenzene from the other $C_8$ aromatic isomers fed to that adsorption zone and passes the para-xylene and ethylbenzene to a second adsorption zone wherein para-xylene and ethylbenzene are separated into relatively purified para-xylene and ethylbenzene streams. The remaining $C_8$ aromatics separated from the para-xylene and ethylbenzene in the first adsorption zone are passed into an isomerization zone to effect the production of additional para-xylene which is eventually recycled to the first adsorption zone allowing increased yield of para-xylene based on the $C_8$ aromatics fed to the first adsorption zone. Ortho-xylene is recovered from the effluent of the isomerization reaction zone.

U.S. Pat. No. 4,024,331 discloses a process for separating a ketose from a liquid feed mixture containing a ketose and an aldose comprising contacting the mixture with an adsorbent comprising an X-zeolite containing one or more selected cations at the exchangeable cationic sites thereby selectively adsorbing a ketose from the feed mixture and thereafter recovering the ketose. Preferably, the ketose is recovered by desorption from the adsorbent with a desorbent material.

U.S. Pat. No. 4,306,107 discloses a process for separating a first component comprising meta-xylene, a second component comprising a mixture of para-xylene and ortho-xylene and a third component comprising ethyl benzene from a liquid feedstream employing an adsorbent comprising a Y-zeolite containing sodium ions at exchangeable cationic sites and a desorbent material comprising toluene which, in combination, have selectivities for the first, second and third components, respectively, in descending order of magnitude. The process uses a simulated-moving bed counter-current flow system with an intermediate raffinate stream taken off the column at about the midpoint of the adsorption zone in addition to the usual extract and raffinate product streams.

SUMMARY OF THE INVENTION

The present invention provides an energy efficient, cyclic process for separating liquid mixtures containing azeotropes, close-boiling components, temperature sensitive components and the like which are very difficult to separate using conventional techniques such as distillation and fractional crystallization. Specifically, the invention discloses a process for separating a liquid feedstock comprising at least a binary mixture into a more adsorbable component (A) and a less adsorbable component (B) with respect to an adsorbent in an adsorption column. The process can be run using a single adsorption column or a plurality of adsorption columns operated in cycle in a predetermined sequence. The process comprises the following sequence of operational steps performed in the order recited in each of the adsorption columns in its turn:

(a) passing the feedstock through the adsorption column and selectively adsorbing the more adsorbable component (A) while discharging a stream enriched in component (B) from the adsorption column;

(b) rinsing the adsorption column in a direction co-current to the feedstock with the more adsorbable component (A) whereby the less adsorbable component (B) is displaced from the adsorption column and withdrawing a stream comprising a mixture of the more adsorbable component (A) and the less adsorbable component (B) from the adsorption column; and (c) rinsing the adsorption column with a liquid desorbent (D) whereby the more adsorbable component (A) and the less adsorbable component (B) are displaced from the adsorbent and withdrawing a stream comprising the more adsorbable component (A) from the adsorption column.

A first embodiment contemplates the separation of a liquid feedstock comprising at least a binary mixture of a more adsorbable component (A) and a less adsorbable component (B) wherein the relative affinity of component (A), component (B) and the desorbent (D) with respect to the adsorbent in each adsorption column is in the order $D \geq A > B$. The process according to the first embodiment comprises the following sequence of operational steps performed in the order recited in each of the adsorption columns in its turn:

(a) passing the feedstock through the adsorption column and selectively adsorbing the more adsorbable component (A) while discharging a stream enriched in component (B);

(b) rinsing the adsorption column in a direction cocurrent to the feedstock with the more adsorbable component (A) whereby the less adsorbable component (B) is displaced from the adsorption column and withdrawing a stream comprising a mixture of the more adsorbable component (A) and the less adsorbable component (B) from the adsorption column; and (c) rinsing the adsorption column with a liquid desorbent (D) whereby the more adsorbable component (A) and the less adsorbable component (B) are displaced from the adsorption column and first withdrawing a stream enriched in component (A) from the adsorption column and then a second stream comprising components (A) and (D).

Optionally, the process according to the first embodiment further comprises the steps of:

(d) separating the second effluent stream of step (c) comprising the more adsorbable component (A) and the desorbent (D) and utilizing a portion of the separated desorbent (D) in step (c);

(e) rinsing the adsorption column with component (B) whereby the desorbent liquid (D) is displaced from the adsorbent and first withdrawing a stream enriched in component (D) and then a second stream comprising the less adsorbable component (B) and the liquid desorbent (D) from the adsorption column; and (f) separating the second effluent stream of step (e) comprising the less adsorbable component (B) and the desorbent liquid (D) and utilizing a portion of the separated desorbent (D) as a source of desorbent (D) in step (c).

The separation of a feedstock containing a mixture of ethanol and water can be accomplished according to the first embodiment wherein the more adsorbable component (A) is ethanol, the less adsorbable component (B) is water, the desorbent liquid (D) is acetone and the adsorbent is activated carbon. Another example wherein the order of adsorptivity with respect to the adsorbent is in the order $D \geq A > B$ is the separation of acetic acid and water wherein the more adsorbable component (A) is acetic acid, the less adsorbable component (B) is water, the desorbent liquid (D) is acetone and the adsorbent is activated carbon.

A second embodiment of the invention contemplates the separation of a feedstock comprising at least a binary mixture of more adsorbable component (A) and a less adsorbable component (B) wherein the relative affinity of the adsorbent for component (A), component (B) and desorbent (D) with respect to the adsorbent is in the order $A > D > B$. The process according to the second embodiment comprises the following sequence of operational steps performed in the order recited in each of the adsorption columns in its turn:

(a) passing the feedstock through the adsorption column and selectively adsorbing the more adsorbable component (A) while discharging a stream enriched in component (B) from the adsorption column;

(b) rinsing the adsorption column in a direction cocurrent to the feedstock with the more adsorbable component (A) whereby the less adsorbable component (B) is displaced from the adsorption column and withdrawing a stream comprising a mixture of the more adsorbable component (A) and the less adsorbable component (B) from the adsorption column; and (c) rinsing the adsorption column with a liquid desorbent (D) whereby the more adsorbable component (A) is displaced from the adsorption column and first withdrawing a stream enriched in component (A) and then a second stream comprising a mixture of the more adsorbable component (A) and the desorbent liquid (D) from the adsorption column.

Optionally, the process according to the second embodiment further comprises:

(d) rinsing the adsorption column with component (B) whereby the desorbent liquid (D) is displaced from the adsorption column and withdrawing therefrom first a stream enriched in component (D) and then a second or subsequent stream comprising less adsorbable component (B) and desorbent liquid (D);

(e) separating the second effluent stream of step (c) comprising the more adsorbable component (A) and the desorbent liquid (D) and recycling a portion of the separated desorbent (D) for use as desorbent (D) in step (c); and (f) separating the second effluent stream of step (d) comprising the less adsorbable component (B) and the desorbent liquid (D) and recycling a portion of the separated desorbent (D) for use as desorbent (D) in step (c).

The separation of a feedstock containing a mixture of methanol and methyl acetate can be effected according to the second embodiment wherein the order of absorptivity with respect to the adsorbent is in the order $A > D > B$. The more adsorbable component (A) is methanol, the less adsorbable component (B) is methyl acetate, the desorbent liquid (D) is ethanol and the adsorbent is NaX zeolite. Another example is the separation of water and ethylenediamine wherein the more adsorbable component (A) is water, the less adsorbable component (B) is ethylenediamine, the desorbent liquid (D) is methanol and the adsorbent is 3A zeolite.

A third embodiment of the present invention comprises the separation of a mixture comprising at least a binary mixture of more adsorbable component (A) and less adsorbable component (B) wherein the relative affinity of the adsorbent for component (A), component (B) and desorbent (D) with respect to the adsorbent is in the order $A > B \geq D$. The process according to the third embodiment comprises the following sequence of operational steps performed in the order recited in each of the adsorption columns in its turn:

(a) passing the feedstock through the adsorption column and selectively adsorbing the more adsorbable component (A) while first discharging a stream enriched in component (D) and then a second or subsequent stream comprising a mixture of the less adsorbable component (B) and the desorbent liquid (D) from the adsorption column;

(b) rinsing the adsorption column in a direction cocurrent to the feedstock with the more adsorbable component (A) whereby the less adsorbable component (B) is displaced from the adsorbent and withdrawing a stream comprising a mixture of the more adsorbable component (A) and the less adsorbable component (B) from the adsorption column; and (c) rinsing the adsorption column with a liquid desorbent (D) whereby the more adsorbable component (A) is displaced from the adsorption column and first withdrawing a stream enriched in component (A) and then a second or subsequent stream comprising a mixture of component (A) and desorbent liquid (D) from the adsorption column.

Optionally, the process according to the third embodiment further comprises:

(d) separating the second effluent stream of step (a) comprising the less adsorbable component (B) and the desorbent liquid (D) and recycling a portion of the separated desorbent (D) for use as desorbent (D) in step (c); and (e) separating the second effluent stream of step (c) comprising the more adsorbable component (A) and the desorbent liquid (D) and recycling a portion of the separated desorbent (D) for use as desorbent (D) in step (c).

The process according to the third embodiment can be used to separate a feedstock containing a mixture of water and ethylenediamine wherein the more adsorbable component (A) is water, the less adsorbable component (B) is ethylenediamine, the desorbent liquid (D) is monoethanolamine and the adsorbent is an A-zeolite.

The fourth embodiment contemplates the separation of a feedstock comprising at least a ternary mixture of a more adsorbable component (A), a less adsorbable component (B) and component (C) wherein the relative adsorptivity of component (A), component (B), component (C) and a desorbent liquid (D) with respect to an adsorbent is in the order A>B and A>C. The process according to the fourth embodiment comprises the following sequence of operational steps performed in the order recited in each of the absorption columns in its turn:

(a) passing the feedstock through the adsorption column and selectively adsorbing the more adsorbable component (A) while discharging a stream comprising a mixture of the less adsorbable component (B) and component (C) from the adsorption column;

(b) rinsing the adsorption column in a direction cocurrent to the feedstock with the more adsorbable component (A) whereby the less adsorbable component (B) and component (C) are displaced from the adsorbent and withdrawing a stream comprising a mixture of the more adsorbable component (A), the less adsorbable component (B) and component (C) from the adsorption column; and (c) rinsing the adsorption column with a liquid desorbent (D) whereby the more adsorbable component (A) is displaced from the adsorption column and first withdrawing a stream enriched in component (A) and then a second or subsequent stream comprising a mixture of the more adsorbable component (A) and desorbent liquid (D) from the adsorption column.

Optionally, the process according to the fourth embodiment further comprises:

(d) separating the stream of step (a) comprising the less adsorbable component (B) and the component (C);

(e) rinsing the adsorption column with a stream of component (B) or (C) to displace component (D) from the adsorption column and first withdrawing a stream enriched in component (D) and then a second or subsequent stream comprising a mixture of (D) and (C) or (D) and (B); and (f) separating the second effluent stream of step (e) comprising components (D) and (C) or (D) and (B).

The process according to the fourth embodiment can be used to separate a mixture of methanol, methyl tert-butyl ether and a mixture of linear and branched $C_4$ hydrocarbons wherein the more adsorbable component (A) is methanol; the less adsorbable component (B) is methyl tert-butyl ether; component (C) is a mixture of linear and branched hydrocarbons having four carbon atoms; the desorbent liquid (D) is a mixture of methanol and linear and branched hydrocarbons having four carbon atoms; and the adsorbent is an A-zeolite.

The process described in the above-mentioned embodiments typically utilizes an adsorbent having a relatively small particle diameter of about 0.2 to about 0.8 mm. Moreover, the feedstock is pressurized to about 10 to 150 psig in order to overcome the pressure drop encountered when the feedstock enters each respective adsorption column.

It is also to be understood that the types of adsorbents described for the examples of separation applications of the different process embodiments described herein are for illustration purposes only. Other adsorbents satisfying the selectivity of adsorption criteria required for each process embodiment can be used as is well known in the art.

The process according to the present invention provides an energy efficient means for separating a feedstock containing an azeotropic mixture, close boiling compounds or temperature sensitive compounds which are typically difficult to separate using conventional techniques such as distillation or crystallization.

DETAILED DESCRIPTION OF THE INVENTION

Figure 1:
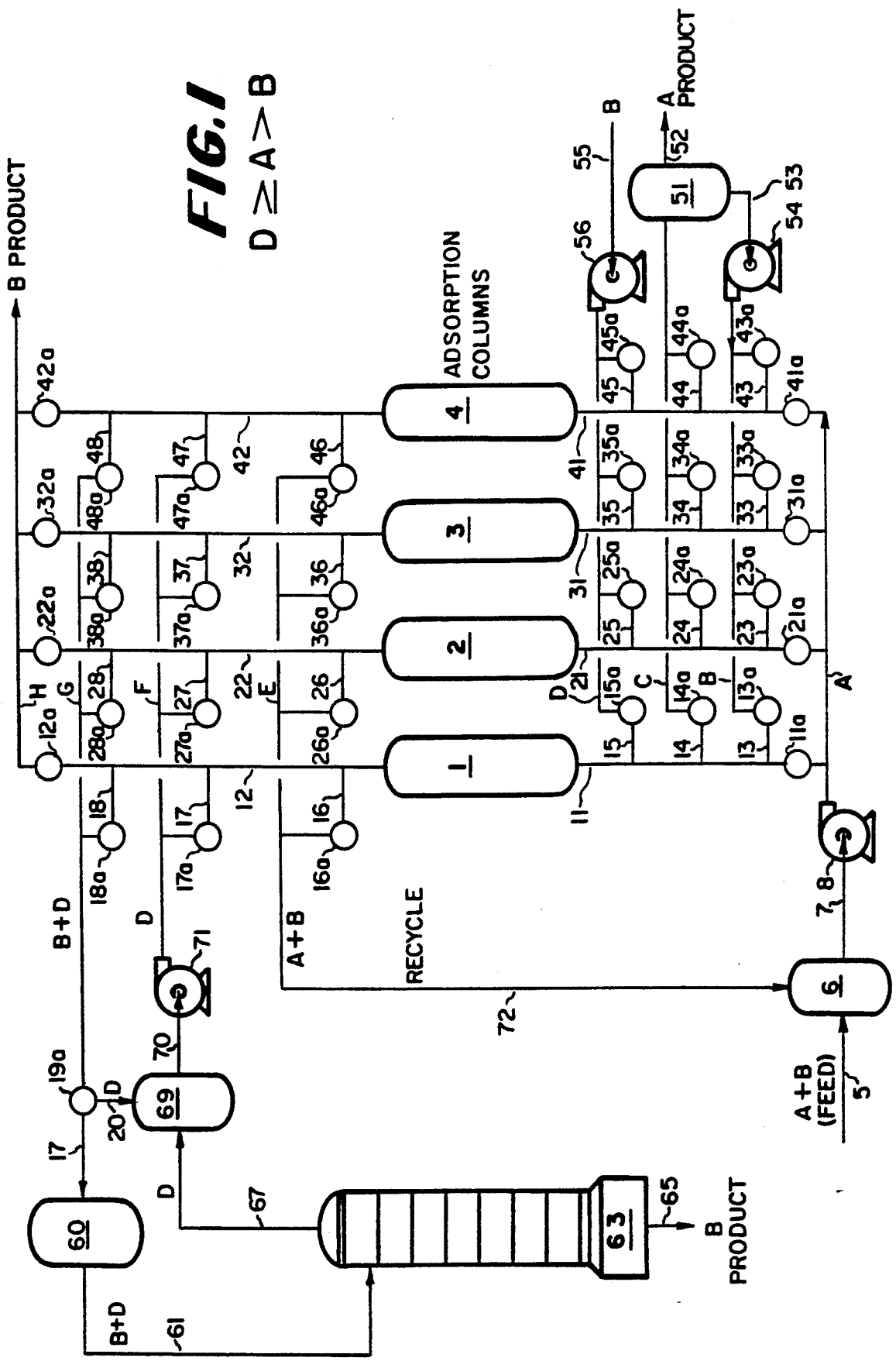
FIG. 1 is a process flow diagram of an embodiment utilizing four adsorption columns operated in cycle in a predetermined sequence.

The present invention discloses a process for the separation of liquid mixtures which are typically difficult to separate economically by conventional processes such as azeotropic, extractive or vacuum distillation. The process can be used to efficiently separate a feedstock comprising at least a binary liquid mixture into a more adsorbable component (A) and a less adsorbable component (B) with respect to an adsorbent within an adsorption column. Use of the process is particularly advantageous when the feedstock contains an azeotropic mixture, close-boiling components or temperature sensitive components wherein separation by convention techniques is commercially difficult. Many different adsorptive processes can be designed for the separation of a feedstock comprising at least a binary liquid mixture comprising components (A) and (B) using the concepts of this invention. The particular steps to be utilized in separating a feedstock comprising at least a binary liquid mixture will depend upon the relative affinity of components (A) and (B) and desorbent (D) with respect to the adsorbent used in the particular process.

These processes are called concentration swing adsorption (CSA) processes because the adsorption and desorption steps of these processes are governed by change in concentration of the liquid adsorbates inside the adsorption column containing the adsorbent. A component is adsorbed when its concentration is high and it is desorbed when its concentration is reduced.

The process can be operated using a single adsorption column or can be operated using a plurality of adsorption columns. The process for separating a feedstock comprising at least a binary liquid mixture into a more adsorbable component (A) and a less adsorbable component (B) with respect to an adsorbent in an adsorption column comprises the steps of:

(a) passing the feedstock through the adsorption column containing the adsorbent and selectively adsorbing the more adsorbable component (A) while discharging a stream enriched in component (B);

(b) rinsing the adsorption column in a direction cocurrent to the feedstock with the more adsorbable component (A) whereby the less adsorbable component (B) is displaced from the adsorbent and withdrawing a stream comprising a mixture of the more adsorbable component (A) and the less adsorbable component (B) from the adsorption column; and (c) rinsing the adsorption column with a liquid desorbent (D) whereby the more adsorbable component (A) and the less adsorbable component (B) are displaced from the adsorption column and withdrawing a stream comprising the more adsorbable component (A) from the adsorption column.

The invention is most clearly understood when considering several embodiments based upon the relative affinity of the adsorbent for the more adsorbable component (A), the less adsorbable component (B) and the desorbent liquid (D). A first embodiment contemplates the separation of a feedstock comprising at least a binary mixture of a more adsorbable component (A) and a less adsorbable component (B) wherein the relative affinity of component (A), component (B) and desorbent (D) with respect to the adsorbent is in the order $D \geq A > B$.

A second embodiment contemplates the separation of a feedstock comprising at least a binary mixture of a more adsorbable component (A) and a less adsorbable component (B) wherein the relative affinity of the adsorbent for component (A), component (B) and desorbent (D) with respect to the adsorbent is in the order $A > D > B$.

A third embodiment contemplates the separation of a feedstock comprising at least a binary mixture of a more adsorbable component (A) and a less adsorbable component (B) wherein the relative affinity of the adsorbent for component (A), component (B) and desorbent (D) with respect to the adsorbent is in the order $A > B \geq D$.

A fourth embodiment contemplates the separation of a feedstock comprising at least a ternary mixture of a more adsorbable component (A), a less adsorbable component (B), and a third component (C) wherein the relative affinity of the adsorbent for component (A), component (B) and desorbent (D) with respect to the adsorbent is in the order $A > B > C > / < D$.

The first embodiment is described in FIG. 1 which illustrates a schematic diagram of a cycle for separating a feedstock comprising a mixture of a more adsorbable component (A) and a less adsorbable component (B) wherein the relative adsorptivity of components (A) and (B) and desorbent (D) with respect to the adsorbent is in the order of $D \geq A > B$. The schematic consists of four parallel adsorption columns 1 through 4; numerous control valves; liquid manifolds A through H; liquid pumps 8, 54, 56 and 71; and distillation column 63. Feedstock is drawn from storage tank 6 having inlet line 5 and outlet line 7 via liquid pump 8 wherein the feedstock is introduced into manifold A.

Manifold A is in flow communication with branch inlet lines 11, 21, 31 and 41 which are connected to the inlet ends of adsorption columns 1, 2, 3 and 4. Lines 11, 21, 31 and 41 are equipped with valves 11a, 21a, 31a and 41a, respectively. Opening of the appropriate valve permits flow of the feedstock into the selected adsorption column being initially placed on stream. Thus, by opening valve 11a, while valves 21a, 31a and 41a are closed, feedstock is caused to flow from manifold A through line 11 and into adsorption column 1.

Adsorption columns 1, 2, 3 and 4 are fitted at their respective outlet ends with lines 12, 22, 32 and 42, respectively, each further equipped with control valves 12a, 22a, 32a and 42a, respectively. Lines 12, 22, 32 and 42 are operatively connected to manifold H through which purified component (B) is collected as product. By opening the appropriate valve 12a, 22a, 32a or 42a, purified (B) product is caused to flow from the corresponding column through line 12, 22, 32 or 42 and into manifold H to be collected as product.

Adsorption columns 1, 2, 3 and 4 are operatively connected to lines 13, 23, 33 and 43, each being further provided with control valves 13a, 23a, 33a and 43a, respectively, such lines being in flow communication with manifold B. Manifold B is in flow communication with manifold C wherein component (A) stored as product in storage tank 51 flows through line 53 and through pump 54 prior to entering manifold B. Each adsorption column is placed in flow communication with discharge manifold C via lines 14, 24, 34 and 44, each of which is equipped with control valves 14a, 24a, 34a and 44a. By opening the appropriate valve 14a, 24a, 34a and 44a, liquid from the inlet end of the appropriate column passes through line 14, 24, 34, or 44 and into manifold C for storage in storage tank 51 prior to collection as product via line 52 or use as a column rinsing liquid.

Adsorption columns 1, 2, 3 and 4 are placed in flow communication with manifold D via lines 15, 25, 35 and 45 which are each fitted with control valves 15a, 25a, 35a and 45a. By opening the appropriate control valve, component (B) is caused to pass through line 55, liquid pump 56 into manifold D and line 15, 25, 35, or 45 into the inlet end of the appropriate adsorption column. Component (B) is obtained as a product from distillation column 63 or may be withdrawn from an optical storage container (not shown).

The discharge ends of columns 1, 2, 3 and 4 are operatively connected to manifold E via lines 16, 26, 36 and 46, which are fitted with control valves 16a, 26a, 36a and 46a, respectively. By opening the appropriate valve 16a, 26a, 36a or 46a, liquid from a particular adsorption column enters lines 12, 22, 32 or 42 flowing into lines 16, 26, 36, or 46 and into manifold E. Manifold E is operatively connected to storage container 6 via line 72.

Adsorption columns 1, 2, 3 and 4 are operatively connected to manifold F via lines 17, 27, 37, and 47 which are connected to lines 12, 22, 32 and 42, respectively. Lines 17, 27, 37 and 47 are equipped with control valves 17a, 27a, 37a and 47a, respectively. By opening the appropriate control valve 17a, 27a, 37a or 47a, desorbent (D) stored in storage tank 69 is caused to be pumped through line 70, manifold F and into the appropriate adsorption column via lines 17, 27, 37 and 47, respectively. Liquid pump 71 provides the pressure necessary to effect such transfer. Manifold F is operatively connected to distillation column 63 and manifold G. For example, overhead distillation product from distillation column 63 is passed through line 67 and into storage tank 69. Liquid from storage tank 69 is passed through line 70, through pump 71 and into manifold F. Storage tank 69 is also connected to manifold G via line 20.

Adsorption columns 1 through 4 are operatively connected to manifold G by lines 18, 28, 38 and 48 which are in flow communication with lines 12, 22, 32 and 42, respectively. By opening control valve 18a, 28a, 38a or 48a, liquid from the respective adsorption column is caused to pass through line 12, 22, 32 or 42, through lines 18, 28, 38 or 48, respectively, and into manifold G. Manifold G is fitted with control valve 19a wherein liquid can be directed to storage tank 60 via line 19 and into distillation column 63 via line 61; or to storage tank 69 via line 20.

Operation of the embodiment represented in FIG. 1 will now be explained in connection with an arbitrarily chosen cycle having four timed separation periods of five minutes per period as set forth in Table 1. Although not limited thereto, the process is illustrated in FIG. 1 requires 4 adsorption columns for continuous operation. However, other arrangements using fewer adsorption columns may be employed if interrupted or discontinuous operation (using idling) of pumps is acceptable. Other arrangements may also be employed (e.g., employing more than four adsorption columns) by appropriate sequencing of the individual steps of the process cycle.

TABLE 1

| Time | Column 1 | Column 2 | Column 3 | Column 4 |
|---|---|---|---|---|
| 0–t1 | Adsorption | B-Rinse | D-Rinse | A-Rinse |
| t1–t2 | A-Rinse | Adsorption | B-Rinse | D-Rinse |
| t2–t3 | D-Rinse | A-Rinse | Adsorption | B-Rinse |
| t3–t4 | B-Rinse | D-Rinse | A-Rinse | Adsorption |

Each of the four respective adsorption columns 1 through 4 undergoes one period of the adsorption step, one period of the (A)-rinse step, one period of the (D)-rinse step and one period of the (B)-rinse step. As illustrated in Table 1, the steps undertaken at startup in each of the adsorption columns 1 through 4 are staggered to enable at least one of the four adsorption columns to undergo the adsorption step at all times during the process cycle. The operation of the invention described in FIG. 1 involves principally the following sequence of steps:

(a) Adsorption—a stream of the liquid feedstock containing a more adsorbable component (A) and a less adsorbable component (B) is passed through an adsorption column containing adsorbent preferentially selective toward retention of component (A) wherein an effluent stream enriched in component (B) is withdrawn from the adsorption column. Component (A) is selectively adsorbed onto the adsorbent and a mass transfer zone (MTZ) is formed inside the adsorbent which moves toward the outlet or discharge end of the column as more feedstock liquid is passed. The adsorbent at the leading edge of the mass transfer zone is saturated with a (B)-rich liquid while the trailing edge of the MTZ is saturated with liquid having a composition (A+B). The adsorption step is continued until the adsorbent is essentially saturated with the feed liquid mixture comprising component (A) and component (B). In other words, the adsorption MTZ has reached the effluent end of the column or somewhat short of it. The effluent liquid, rich in component (B), forms a part of the (B)-rich product stream.

(b) A-Rinse—the adsorption column is rinsed with a liquid stream which is very rich in component (A). This rinse step is carried out in a direction co-current to the direction of the feedstock flow. The adsorption column effluent during this step has a feed-like composition (A+B) which is recycled as additional feedstock. The (A)-rinse step is continued until the adsorption column is essentially saturated with the (A)-rich liquid.

(c) D-Rinse—the adsorption column is rinsed with desorbent liquid (D). The effluent from the adsorption column is a liquid rich in component (A) which is partly withdrawn as component (A) product and partly stored for use as (A)-rich rinse liquid in step (b). The effluent in the latter part of this step may contain a mixture of components (A) and (D) which may optionally require an additional separation by distillation to produce an A-rich product stream and a D-rich stream to be used in step (d) below.

(d) B-Rinse—at the end of step (c), the adsorption column is rinsed with a liquid stream rich in component (B). The effluent from the column is initially very rich in desorbent (D) which is stored for use as (D)-rinse fluid in step (c). The remaining effluent is a mixture of (B+D) which is separated by distillation to product a (D)-rich and a (B)-rich stream. The (D)-rich stream is recycled to supply the (D)-rinse liquid in step (c). The (B)-rich bottoms distillation product forms a part of the (B)-rich product. The remainder of this (B)-rich distillation product along with a part of the (B)-rich effluent from step (a) forms the (B)-rich rinse liquid in step (d). The adsorption column is essentially saturated with component (B) at the end of this step and a new process cycle begins with step (a).

The valve positions during the above-mentioned operating cycle are set forth in Table 2. The designation O indicates that the valve is open while a C represents a closed valve. The operative sequence of steps occurring in adsorption column 1 during a complete adsorption cycle will now be described in exhaustive detail so that operation of a continuous process will be fully understood. The identical sequence of steps according to Table 1 occurs in staggered sequence in adsorption columns 2, 3 and 4.

TABLE 2

| Valve | Valve Operation Schedule | | | |
|---|---|---|---|---|
|  | 0–t1 | t1–t2 | t2–t3 | t3–t4 |
| 11a | O | C | C | C |
| 12a | O | C | C | C |
| 13a | C | O | C | C |
| 14a | C | C | O | C |
| 15a | C | C | C | O |
| 16a | C | O | C | C |
| 17a | C | C | O | C |
| 18a | C | C | C | O |
| 19a | C | C | C | C |
| 21a | C | O | C | C |
| 22a | C | O | C | C |

TABLE 2-continued

| Valve | Valve Operation Schedule | | | |
|---|---|---|---|---|
| | 0–t1 | t1–t2 | t2–t3 | t3–t4 |
| 23a | C | C | O | C |
| 24a | C | C | C | O |
| 25a | O | C | C | C |
| 26a | C | C | O | C |
| 27a | C | C | C | O |
| 28a | O | C | C | C |
| 31a | C | C | O | C |
| 32a | C | C | O | C |
| 33a | C | C | C | O |
| 34a | O | C | C | C |
| 35a | C | O | C | C |
| 36a | C | C | C | O |
| 37a | O | C | C | C |
| 38a | C | O | C | C |
| 41a | C | C | C | O |
| 42a | C | C | C | O |
| 43a | O | C | C | C |
| 44a | C | O | C | C |
| 45a | C | C | O | C |
| 46a | O | C | C | C |
| 47a | C | O | C | C |
| 48a | C | C | O | C |

Again, referring to the embodiment disclosed in FIG. 1 and the sequence periods and valve positions designated in Table 1 and 2, adsorption column 1 undergoes one sequence period of the adsorption step. Feedstock (A+B), stored in storage tank 6, is introduced into adsorption column 1 by opening valves 11a and 12a and closing valves 14a, 15a, 16a, 17a and 18a thereby allowing feedstock to flow through line 7, manifold A, line 11 and into adsorption column 1 which contains an adsorbent preferentially selective toward adsorption of component (A). The adsorption step is continued until column 1 is essentially saturated with the feed mixture. The flow of liquid is assisted by pump 8. Component (A) is selectively adsorbed onto the adsorbent and a mass transfer zone (MTZ) is formed inside the adsorbent which moves toward the discharge end of adsorption column 1 as more feedstock is passed. The adsorption step is completed when the MTZ reaches the effluent end of the column or somewhat short of it by a predesigned set point. The less selectively adsorbed component (B) exits the discharge end of column 1 via line 12 and flows into manifold H to be collected as product.

At the end of the adsorption step, Column 1 is rinsed with a liquid stream rich in component (A). More particularly, valves 13a and 16a are opened enabling a rinse stream rich in component (A), stored in storage tank 51, to be pumped via pump 54 through line 53, manifold (B) and lines 13 and 11 into column 1 in a direction co-current to the feedstock. The adsorption column effluent during this step has a feed-like composition (A+B) which is passed through line 16, manifold E and line 72 to be mixed with fresh feedstock in storage tank 6. This step is continued until adsorption column 1 is essentially saturated with liquid rich in component (A).

The next step in the cycle involves rinsing adsorption column 1 with desorbent (D). Control valves 17a and 14a are opened and the (D)-rich stream is pumped via pump 71 through line 70, manifold F and lines 17 and 12 into column 1 in a direction counter-current to the flow of the feedstock. The effluent is a stream rich in component (A) which is withdrawn from the inlet end of column 1 passing through lines 11 and 14 and manifold C to be collected as component (A) product or stored in storage vessel 51. This step is continued until adsorption column 1 is essentially saturated with the desorbent (D). During this step, the latter portion of the effluent from the column 1 may contain a mixture of components (A) and (D) which can be separated by distillation to produce an A-rich and a D-rich stream. The A-rich stream can be sent to storage tank 51 and the D-rich stream can be sent to storage tank 69. If this option is practiced, a distillation column will be required to process a part of the column effluent in manifold C (not shown in FIG. 1). Furthermore, it should be understood that the flow of D-rich stream into the column in a direction counter-current to feed flow is optional. It may be necessary to flow the D-rich stream into the column co-current to feed flow.

Following the (D)-rinse step, column 1 undergoes a (B)-rinse step wherein a stream rich in component (B), obtained as a product from distillation column 63, is passed through column 1 in a direction co-current to the direction of the feedstock. Valves 15a and 18a are opened and pump 56 is used to pressurize the (B)-rich stream causing the (B)-rich stream to flow through line 55, manifold D, line 15 and line 11 into column 1 until the column is essentially saturated with component (B). The adsorption column effluent is initially very rich in component (D) and valves 15a, 18a and 19a are opened allowing the effluent to pass through line 12, manifold G and line 20 to be stored as (D)-product in storage vessel 69.

Thereafter, valve 19a is readjusted to allow the remaining effluent mixture of component (B) and desorbent (D) to pass through line 19 into storage vessel 60 which provides feed for distillation column 63 via line 61. The distillation of the mixture (B+D) produces a stream enriched in component (B) which is collected as product and/or used in the (B)-rinse step. Desorbent (D) is utilized in the (D)-rinse step. Column 1 is now essentially saturated with component (B) at the end of this step and the column is prepared to begin another process cycle. Again, it should be understood that the flow of B-rich fluid into the column during this step can be counter or co-counter to the direction of feed flow.

The process proceeds according to the above-mentioned steps enumerated in Table 1. While the sequence periods are depicted as being of equal length, this is neither required or necessary. The times will be set by allowable maximum liquid flow rates, valve and line sizes and the properties of the adsorbent used. Alternate routines may be employed for establishing the duration of each of the cycle steps. For example, the end of a particular step may be determined by other techniques known in the art such as by analysis of the composition of the adsorption column effluent.

The composition of the (B+D) liquid mixture which is produced in the latter part of the (B)-rinse step of the process and which is separated by distillation varies with time during this step. Initially the composition is essentially desorbent (D) and then the composition changes to essentially pure component (B). This mixture of components (B+D) can be collected in storage tank 60 for mixing and then fed to a particular tray in distillation column 63 as a fluid stream of constant composition or the stream can be split into several (two or three) mixed streams of varying composition and then fed at different tray levels in distillation column 63. The latter approach is preferred. The same phenomenon and operation is valid if the latter part of the effluent of step (c), the D rinse step, is separated by distillation to produce a D-rich and an A-rich stream.

An example of an application suitable for practicing the embodiment according to FIG. 1 wherein the relative adsorptivity is in the order $D \geq A > B$ is the separation of an ethanol/water mixture. This mixture forms an azeotrope of about 90.0 mole % ethanol in the liquid phase and thus, difficult to separate by distillation. In this example, ethanol is the more adsorbable component (A) and water is the less adsorbable component (B) with respect to the adsorbent. Activated carbon is used as the adsorbent which selectively adsorbs ethanol from the mixture. Acetone can be used as the liquid desorbent (D) which adsorbs slightly more selectively over ethanol onto the carbon adsorbent. Thus, this system satisfies the required selectivity criteria $D \geq A > B$.

Figure 2:
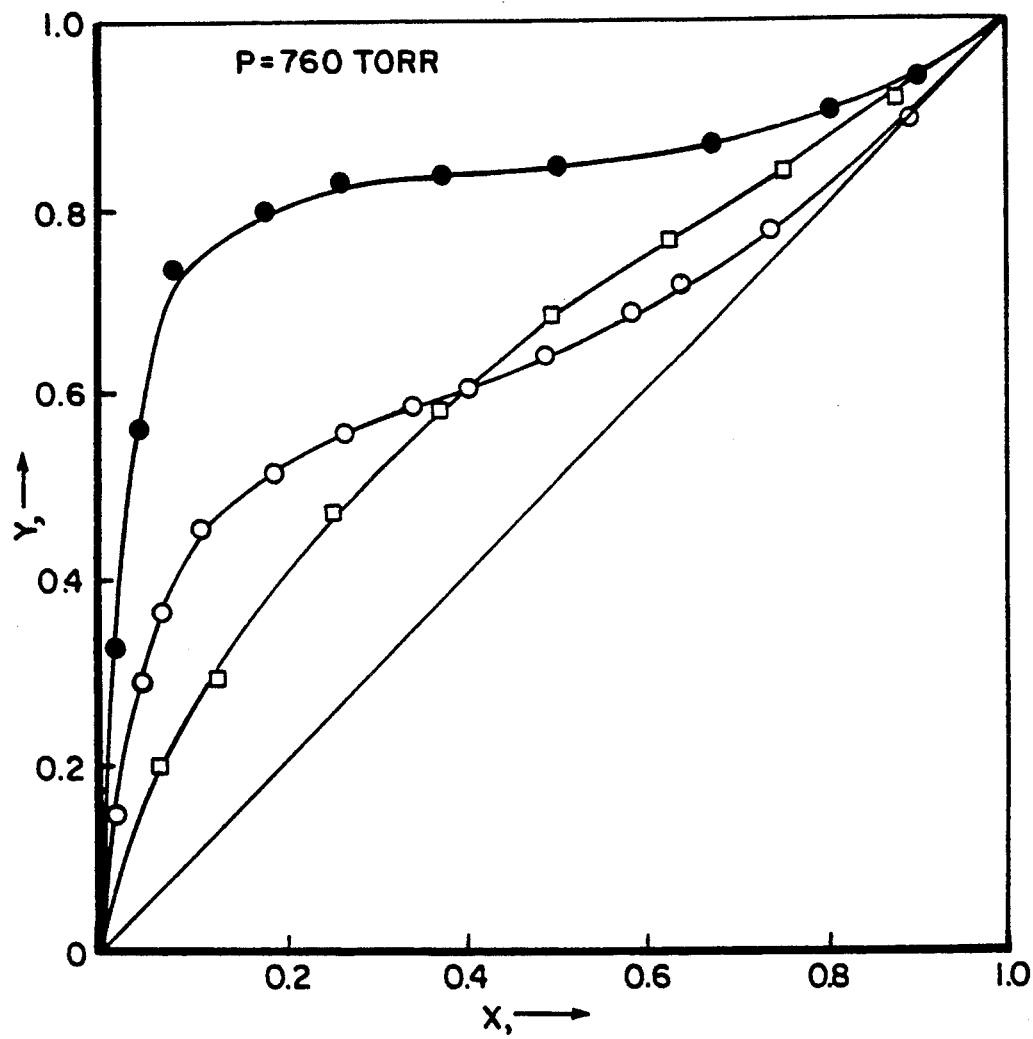
FIG. 2 is a vapor-liquid equilibrium diagram for various azeotropic and other liquid mixtures.

The liquid mixtures of acetone (desorbent D)+water (the less selectively adsorbable component B) and acetone plus ethanol (the more selectively adsorbable component A), on the other hand, are very easy to separate by distillation. FIG. 2 shows the vapor-liquid equilibrium diagrams for ethanol-water, acetone-water and acetone-ethanol mixtures at a total pressure of 0.1 atmosphere. FIG. 2 plots liquid phase mole fraction of component 1 ($x_1$) in equilibrium with the vapor phase mole fraction of the same component ($y_1$). The graph demonstrates that the ethanol-water mixture forms an azeotrope at $x_1 = 0.9$ while the acetone-water and ethanol-acetone mixtures exhibit large differences between $x_1$ and $y_1$ in the entire composition range making possible an efficient separation by distillation.

Figure 3:
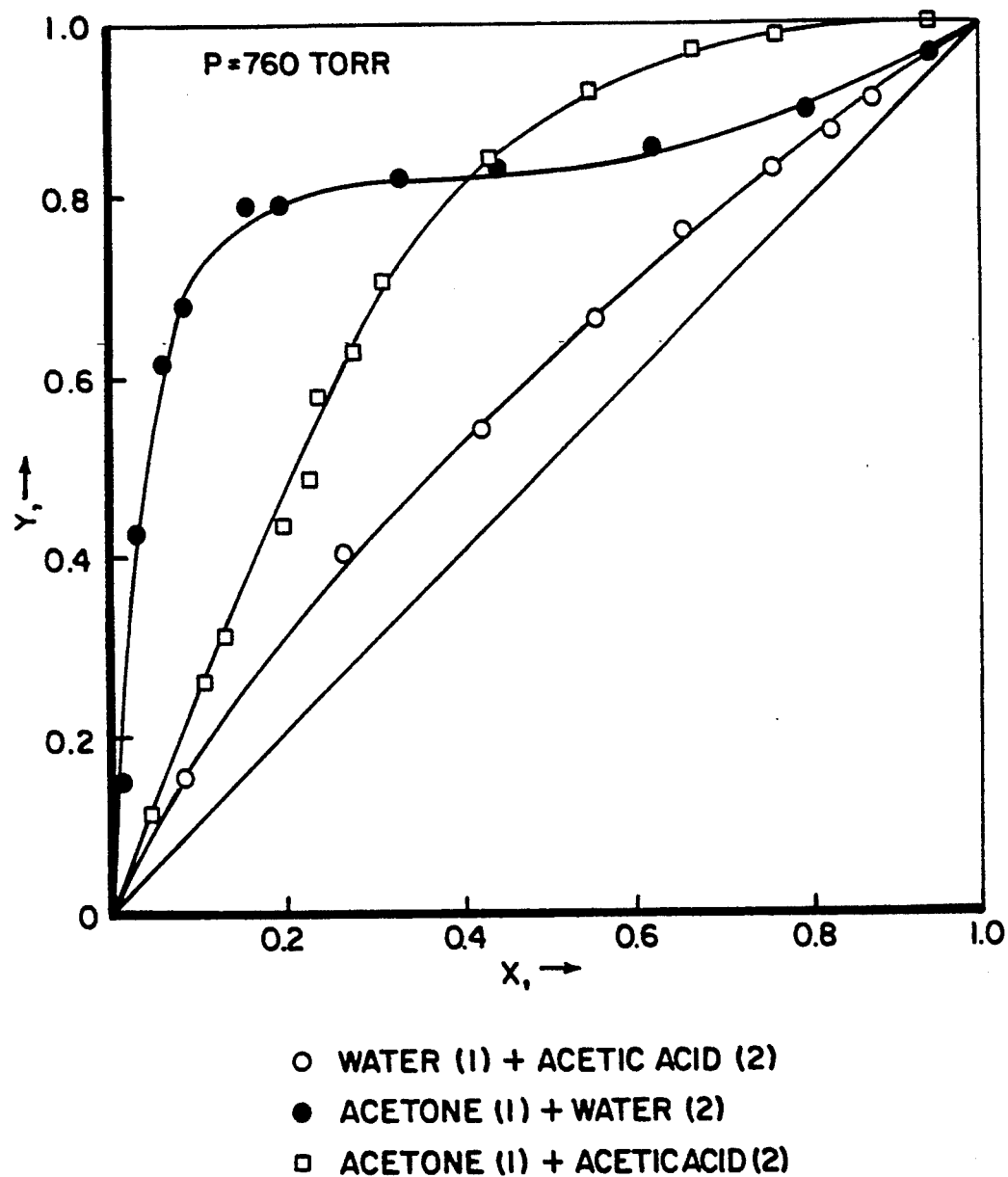
FIG. 3 is a vapor-liquid equilibrium diagram for various azeotropic and other liquid mixtures.

Another example of an application suitable for employing the embodiment according to FIG. 1 is the separation of acetic acid (A) and water (B) mixtures. These two liquids are close boiling having a relative volatility of 1.5 to 2.0. Consequently, the mixture is difficult to separate by distillation. The embodiment according to FIG. 1 readily effects separation of acetic acid and water wherein activated carbon is utilized as the adsorbent and acetone is utilized as the liquid desorbent (D). FIG. 3 illustrates the vapor-liquid equilibria data for the acetic acid-water, acetic acid-acetone, and acetone-water binaries at 1.0 atmosphere pressure. It may be seen that the difference between $x_1$ and $y_1$ for the first binary is not large, but the difference between the second and third binaries, which are the liquid streams to be separated by distillation following the adsorption process, are very large making them easy candidates for separation by distillation.

The process described in each of the embodiments of this invention is preferably run utilizing adsorbents having a relatively small particle diameter of about 0.2 to about 0.8 mm although a broad range of particle sizes can be employed. This preferred particle size will shorten the distance of diffusion of the adsorbate molecules and will enhance the rate of adsorption. On the other hand, smaller particles will increase the pressure drop within the column during all steps of the process cycle. This pressure drop is overcome by compressing the liquid streams entering the adsorbent within each adsorption column to a pressure of about 10 to 150 psig. Since liquids are incompressible fluids, such compression will not significantly add to the energy requirements of the process.

Figure 4:
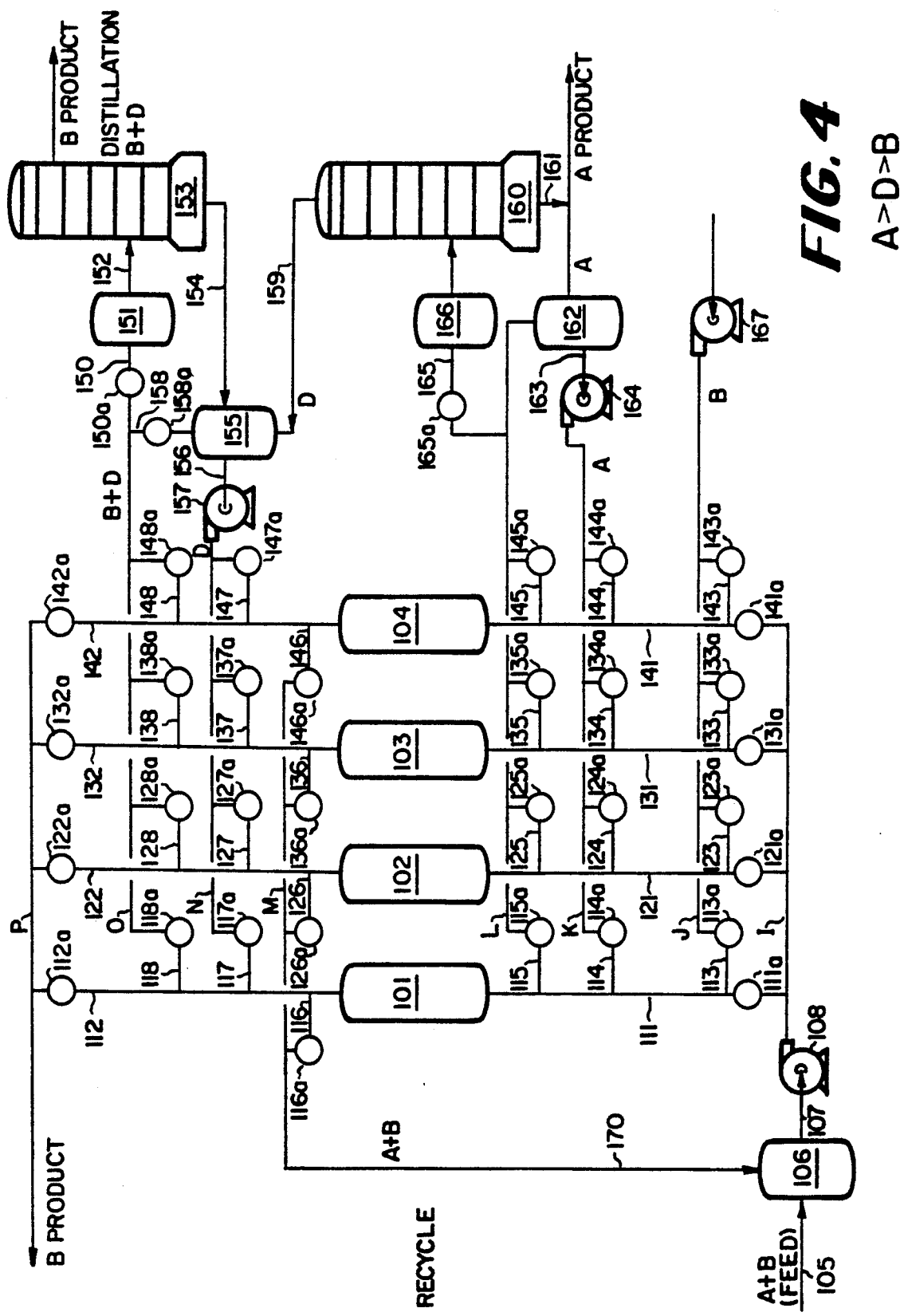
FIG. 4 is a process flow diagram of an embodiment utilizing four adsorption columns operated in cycle in a predetermined sequence.

The second embodiment of the invention contemplates the separation of mixtures comprising components (A) and (B) wherein the relative affinity of the more adsorbable component (A), the less adsorbable component (B) and the desorbent (D) with respect to the adsorbent is in the order $A > D > B$. FIG. 4 illustrates a schematic of an embodiment of the present invention which is suitable for such a separation. The schematic consists of four parallel adsorption columns 101 through 104, numerous control valves, liquid manifolds I through P, liquid pumps 108, 157, 164 and 167, and distillation columns 153 and 160. Feedstock containing components (A) and (B) is drawn through line 105 into storage vessel 106 and through lines 107 by liquid pump 108 wherein the feedstock is introduced into manifold I. Manifold I is operatively connected to adsorption columns 101, 102, 103 and 104 via lines 111, 121, 131 and 141. Each of these lines is equipped with a valve 111a, 121a, 131a or 141a, respectively. Opening of the appropriate valve permits flow of the feedstock into the selected adsorption column being placed on stream. Thus, by opening valve 111a, while valves 121a, 131a and 141a are closed, feedstock is caused to flow from manifold I through line 111 and into adsorption column 101.

Adsorption columns 101, 102, 103 and 104 are further provided at their respective outlet ends with lines 112, 122, 132 and 142, respectively, each further equipped with control valves 112a, 122a, 132a and 142a, respectively. Lines 112, 122, 132 and 142 are operatively connected to manifold P through which purified component (B) product is withdrawn. By opening the appropriate valve 112a, 122a, 132a or 142a, purified component (B) is caused to flow from the discharge end of adsorption column 101, 102, 103 or 104 through line 112, 122, 132 or 142 and into manifold P to be collected as product.

Each of columns 101, 102, 103 and 104 is further fitted with lines 113, 123, 133 and 143, each being further provided with control valves 113a, 123a, 133a and 143a, respectively, such lines being placed in flow communication with manifold J. By opening the appropriate valve 113a, 123a, 133a, or 143a, liquid is caused to flow through manifold J and lines 113, 123, 133 and 143 into lines 111, 121, 131 and 141, respectively, and into adsorption columns 101, 102, 103 and 104. Pump 167 provides the required pressure to assist the transfer of liquid.

Each adsorption column is placed in flow communication with manifold K via lines 114, 124, 134 and 144, each line which is equipped with control valves 114a, 124a, 134a and 144a. By opening the appropriate valve 114a, 124a, 134a and 144a, liquid from storage tank 162 can be fed via manifold K into the desired adsorption column. Liquid pump 164 assists the flow of liquid in manifold K.

Adsorption columns 101, 102, 103 and 104 are placed in flow communication with manifold L via lines 115, 125, 135, and 145 which are each fitted with control valves 115a, 125a, 135a and 145a. By opening the appropriate control valve 115a, 125a, 135a or 145a, liquid is caused to pass through lines 115, 125, 135 or 145 into manifold L. Manifold L is in flow communication with storage vessels 162 and 165 wherein the opening of valve 165a causes liquid to flow from manifold L into line 165 and into storage vessel 166 for eventual use as feed for distillation column 160. The closing of valve 165a causes liquid in manifold L to be passed into storage tank 162.

The discharge ends of columns 101, 102, 103 and 104 are operatively connected to manifold M via lines 116, 126, 136 and 146, respectively, each line being fitted with control valves 116a, 126a, 136a and 146a. By opening the appropriate control valve 116a, 126a, 136a, or 146a, liquid from the discharge end of each respective column is caused to flow through lines 116, 126, 136 or 146 and into manifold M to be recycled to storage vessel 106 for use as additional feedstock.

Adsorption columns 101, 102, 103 and 104 are placed in flow communication with manifold N via lines 117, 127, 137 and 147, respectively, each being fitted with control valves 117a, 127a, 137a and 147a. By opening the appropriate control valve 117a, 127a, 137a or 147a, liquid from storage tank 155 is caused to flow through line 156, as assisted by pump 157, into manifold N and through lines 117, 127, 137 or 147 into lines 112, 122 132 or 142 and into adsorption columns 101, 102, 103 or 104, respectively.

Adsorption columns 101, 102, 103 and 104 are placed in flow communication with manifold O via lines 118, 128, 138 and 148, respectfully, each line being fitted with control valves 118a, 128a, 138a and 148a. By opening the appropriate valve 118a, 128a, 138a, or 148a, liquid from the discharge end of column 101, 102, 103 or 104 is caused to flow through lines 112, 122, 132, or 142, and into lines 118, 128, 138 or 148, respectively, thereby supplying manifold O with process liquid.

Manifold O is operatively connected to storage tanks 151 and 155 via control valves 150a and 158a, respectively. By opening control valve 150a or 158a, liquid in manifold O is caused to flow, respectively, into storage tank 153 or 155. Liquid from storage tank 151 provided feed for distillation column 153, via line 152. One product of distillation column 153 flows through line 154 into storage vessel 155 where such liquid is mixed with the same product of distillation column 160 which flows through line 159 into storage vessel 155.

The embodiment represented in FIG. 4 will now be explained in connection with an arbitrarily chosen cycle having four timed separation periods of five minutes per period as set forth in Table 3. Although not limited thereto, the embodiment as illustrated in FIG. 4 requires 4 adsorption columns for continuous operation. However, other arrangements using fewer adsorption columns may be employed if interrupted or discontinuous operation (using idling) of pumps is acceptable. Other arrangements may also be employed (e.g., employing more than four adsorption columns by appropriate sequencing of the individual steps of the process cycle).

TABLE 3

| Time | Column 1 | Column 2 | Column 3 | Column 4 |
| --- | --- | --- | --- | --- |
| 0–t1 | Adsorption | B-Rinse | D-Rinse | A-Rinse |
| t1–t2 | A-Rinse | Adsorption | B-Rinse | D-Rinse |
| t2–t3 | D-Rinse | A-Rinse | Adsorption | B-Rinse |
| t3–t4 | B-Rinse | D-Rinse | A-Rinse | Adsorption |

Each of the respective adsorption columns 101 through 104 undergoes one period of the adsorption step, one period of the (A)-rinse step, one period of the (D)-rinse step and one period of the (B)-rinse step. As illustrated in Table 3, the steps undertaken as startup in each of adsorption columns 101 through 104 are staggered to enable at least one of the four adsorption columns to undergo the adsorption step at all times during the process cycle. The operation of the embodiment described in FIG. 4 involves principally the following sequence of steps.

(a) Adsorption—a stream of the liquid feedstock mixture (component A + component B) is passed through an adsorption column containing an adsorbent preferentially selective toward adsorption of component (A). Component (A) is selectively adsorbed onto the adsorbent and a mass transfer zone is formed inside the adsorbent which moves toward the discharge end of the column as more feedstock liquid is passed. The column at the leading edge of the MTZ is saturated with a (B)-rich liquid while the trailing edge of the MTZ is saturated with the feedstock. The step is continued until the adsorption column is essentially saturated with component (A). In other words, the step is stopped when the MTZ reaches the effluent end of the column or somewhat short or it by a pre-determined amount. The (B)-rich effluent liquid produced during this step forms a part of the (B)-rich product stream.

(b) A-Rinse—at the end of step (a), the column is rinsed with a liquid stream which is very rich in component (A). This rinse step is carried out in a direction co-current to the direction of flow of the feedstock. The effluent during this step has a feed-like composition (a mixture of the more adsorbable component (A) and the less adsorbable component (B)), which is recycled as feedstock by mixing with fresh feedstock. The step is continued until the column is essentially saturated with component (A).

(c) D-Rinse—at the end of step (b), the column is rinsed with the desorbent liquid (D). The effluent during this step is an (A + D) mixture which is separated by distillation to produce an (A)-rich product stream and a stream of component (D) which is recycled to provide the (D)-rinse fluid. The initial portion of the effluent during this step is produced as an (A)-rich stream which may be directly withdrawn as product without distillation. A part of the (A)-rich product from this step is used in step (b).

(d). B-Rinse—at the end of step (c), the column is rinsed in a direction co-current to the feed with a stream of the less adsorbable component (B) until the adsorption column is essentially saturated with component (B). The effluent during this step is a mixture of component (B) and desorbent (D) which is separated by distillation to produce a (B)-rich stream and a (D)-rich stream. The initial portion of this effluent is essentially composed of component (D) and it may be directly used as the rinse liquid in step (c). A portion of the (B)-rich stream is withdrawn as product and a portion is recycled as the rinse fluid in step (d). The (D)-rich stream is used in step (c) as a column rinse. The column is now ready to start a new cycle starting with step (a).

The valve positions during the above-mentioned operating cycle are set forth in Table 4. The designation O indicates that the valve is open while a C indicates a closed valve. The operative sequence of steps occurring in adsorption column 101 during a complete adsorption cycle will now be described in exhaustive detail so that operation of a continuous process will be fully understood. The identical sequence of steps according to Table 3 occurs in staggered sequence in adsorption columns 102, 103 and 104.

TABLE 4

| Valve | Valve Operation Schedule | | | |
| --- | --- | --- | --- | --- |
|  | 0–t1 | t1–t2 | t2–t3 | t3–t4 |
| 112a | O | C | C | C |
| 113a | C | C | C | O |
| 114a | C | O | C | C |
| 115a | C | C | O | C |
| 116a | C | O | C | C |
| 117a | C | C | O | C |
| 118a | C | C | C | O |
| 119a | O | C | C | C |
| 122a | C | O | C | C |

TABLE 4-continued

| Valve | Valve Operation Schedule | | | |
|---|---|---|---|---|
| | 0–t1 | t1–t2 | t2–t3 | t3–t4 |
| 123a | O | C | C | C |
| 124a | C | C | O | C |
| 125a | C | C | C | O |
| 126a | C | C | O | C |
| 127a | C | C | C | O |
| 128a | O | C | C | C |
| 129a | C | O | C | C |
| 132a | C | C | O | C |
| 133a | C | O | C | C |
| 134a | C | C | C | O |
| 135a | O | C | C | C |
| 136a | C | C | C | O |
| 137a | C | C | C | C |
| 138a | O | O | C | C |
| 139a | C | C | O | C |
| 142a | C | C | C | O |
| 143a | C | C | O | C |
| 144a | O | C | C | C |
| 145a | C | O | C | C |
| 146a | O | C | C | C |
| 147a | C | O | C | C |
| 148a | C | C | O | C |
| 149a | C | C | C | O |
| 150a | C | C | C | C |
| 158a | C | C | C | C |
| 165a | C | C | C | C |
| | | | | C |
| | | | | C |

Again, referring to the embodiment disclosed in FIG. 4 and the sequence periods and valve positions designated in Tables 3 and 4, adsorption column 101 undergoes one sequence period of the adsorption step. Multicomponent feedstock is introduced into adsorption column 101 by opening valves 111a and 112a and closing valves 114a, 115a, 116a, 117 a and 118a thereby allowing feedstock to flow from storage vessel 106 through line 107, pump 108, manifold I, line 111 and into adsorption column 101 which contains an adsorbent preferentially selective toward retention of component (A). The adsorption step is continued until the adsorbent is essentially saturated with component (A). Component (A) is selectively adsorbed onto the adsorbent and a mass transfer zone (MTZ) is formed inside the adsorbent which moves toward the effluent end of the adsorption column as more feedstock liquid is passed. The less selectively adsorbed component (B) exits the discharge end of column 101 via line 112 and flows into manifold P to be collected as product while component (A) is selectively retained by the adsorbent.

At the end of the adsorption step, Column 101 is rinsed with a liquid stream which is very rich in component (A). More particularly, valves 114a and 116a are opened enabling a rinse stream rich in component (A), stored in storage vessel 152, to be pumped via pump 164 through line 163, manifold K and line 114 wherein the (A)-rich stream flows co-current to the direction of the feedstock through the adsorbent. The effluent during this step has a feed-like composition (A+B) which is passed through line 116, manifold M and line 170 to be mixed with fresh feedstock in storage vessel 106. This step is continued until adsorption column 101 is essentially saturated with (A)-rich liquid.

The next step in the cycle involves rinsing column 101 with desorbent (D). Control valves 115a and 117a are opened and the (D)-rich stream is pumped from storage vessel 155 via pump 157 and flows through lines 156, manifold N, line 117 and line 112 into column 101 in a direction counter-current to the flow of the feedstock. The effluent is a mixture of component (A) and desorbent (D) which is withdrawn from the inlet end of column 101 passing through lines 111 and 114 and manifold L. The initial portion of the effluent during this step is an (A)-rich stream which may be directly withdrawn as product without distillation by passing the A-rich liquid into storage vessel 162. As the (A)-rich stream breaks through the MTZ, the effluent composition becomes a mixture of component (A) and desorbent (D). Valve 165a is opened allowing the mixture to flow through line 165 into storage vessel 166. Storage vessel 166 provides feed (a mixture of component (A) and desorbent (D)) for distillation column 160. Distillation column 160 separates the mixture into a distillation product which is an (A)-rich stream which is collected as product and a product which is a (D)-rich stream which is routed to storage vessel 155 via line 159 for future use in the process. Optionally, the (D)-rinse step can be carried out co-current to feed flow direction by appropriate valving arrangements.

Following the (D)-rinse step, column 101 undergoes a (B)-rinse step wherein a (B)-rich stream, obtained as a product from distillation column 153, is passed through column 101 is a direction co-current to the direction of the feed. The opening of valves 113a and 118a allows the (B)-rich stream to flow through manifold J, and lines 113 and 111 into the inlet end of column 101 until the column is essentially saturated with the less adsorbable component (B). The column effluent is initially very rich in desorbent (D) wherein valve 158a is opened allowing the effluent to pass through line 112, manifold O and line 158 to be stored as desorbent (D) in storage vessel 155. Following the breakthrough of component (B) in the MTZ, valve 158a is closed and valve 150a is opened wherein the remaining effluent, a mixture of component (B) and desorbent (D), is passed through line 150 into storage vessel 151 which provides (B+D) feed for distillation column 153. The distillation of the (B+D) mixture produces additional (B)-product to be collected and/or used in the (B)-rinse step and desorbent (D) which is utilized in the (D)-rinse step. Alternatively, the (B) rinse step can be carried out in a direction counter-current to the feedstock flow by appropriate valving arrangements. Column 101 is essentially saturated with component (B) at the end of this step and the column is now ready for another process cycle.

The process proceeds according to the above-mentioned steps enumerated in Table 3. While the sequence periods are depicted as being of equal length, this is neither required or necessary. The times will be set by allowable maximum liquid flow rates and valve and line sizes and the adsorption characteristics of the adsorbent.

The composition of the (B+D) liquid mixture which is produced in the (B)-rinse step of the process and which is to be separated by distillation varies with time during this step. Initially the composition is essentially desorbent (D) and then the composition changes to essentially component (B). This mixture can be collected in storage tank 151 for mixing and then fed to a particular tray in the distillation column as a fluid stream of constant composition or the stream can be split into several (two or three) mixed streams of varying compositions and then fed to distillation column 153 at different tray levels in the column. The later approach is preferred.

Although FIG. 4 shows a four column system for carrying out the process, other numbers of columns can be used. Similarly, some of the liquid storage tanks shown in FIG. 4 may not be necessary. The liquid pumps used to force the process streams through the columns will supply the energy required to overcome the pressure drop within each adsorption column. The switching of the valves during a cycle should be designed to provide smooth operation of the cycle as presented in Table 4.

The (A+D) effluent from the adsorbent during step (c) of the above-mentioned cycle varies in composition over time. The mixture can be fed to the distillation columns as a single (A+D) stream or can be collected in fractions and fed to different trays of the distillation columns depending on the composition of a particular fraction. The second option is preferred.

Figure 5:
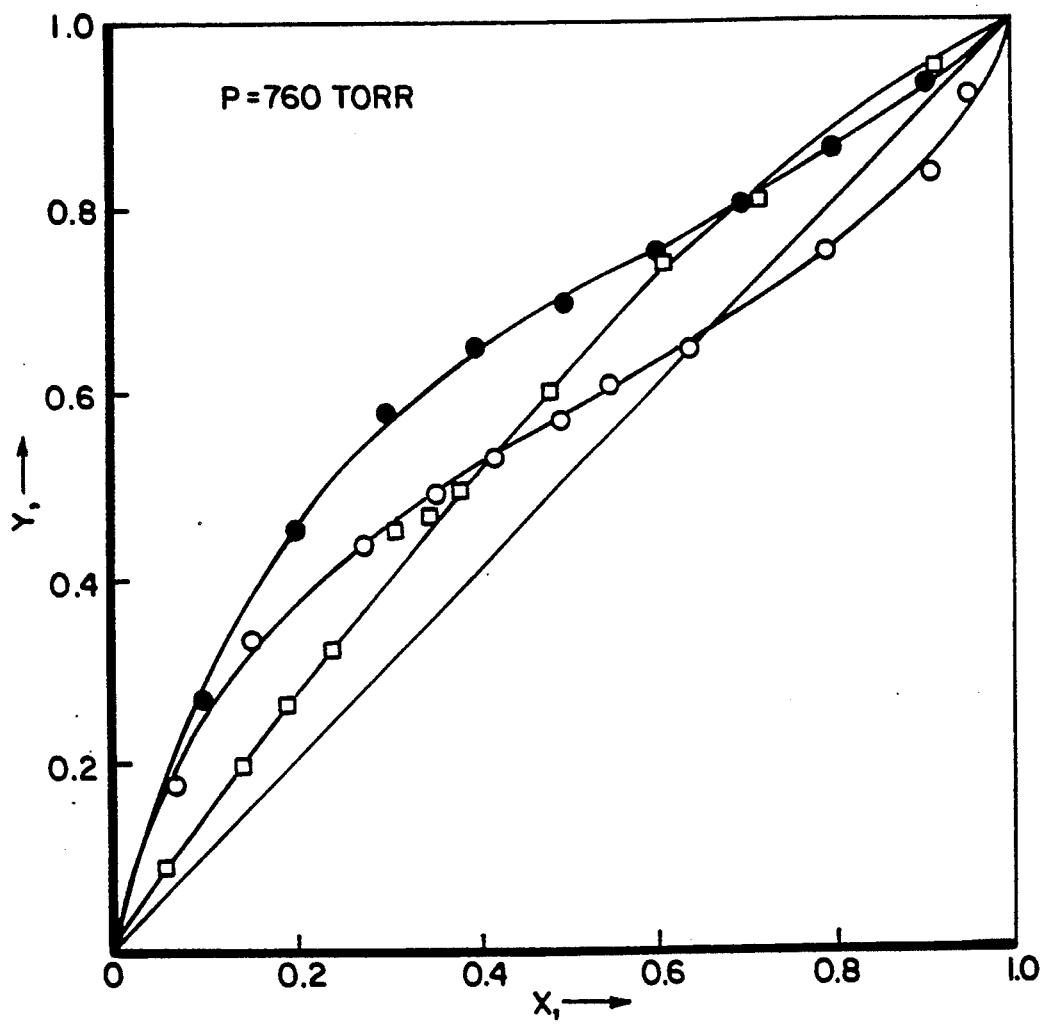
FIG. 5 is a vapor-liquid equilibrium diagram for various azeotropic and other liquid mixtures.

An example of the process according to the embodiment illustrated in FIG. 4 wherein the relative adsorptivity is in the order A>D>B with respect to the adsorbent is the separation of methanol (A) and methyl acetate (B) mixture which forms an azeotrope at a composition of 65.0 mole % (A) in the liquid phase. FIG. 5 shows the vapor-liquid equilibrium diagram for this mixture at 1.0 atmospheric pressure wherein the liquid phase composition of component 1 ($x_1$) is plotted against its vapor phase composition ($y_1$). The mixture can be separated by selective adsorption of methanol (A) on NaX zeolite using the embodiment of FIG. 4 and using ethanol (D) as the desorbent. The relative selectivities of adsorption of these components on 13X zeolite is A>D>B. Methyl acetate (B)+ethanol (D) mixtures and methanol (A)+ethanol (D) mixtures do not form azeotropes as may be seen from the vapor-liquid equilibrium diagram of FIG. 5 and each mixture can be easily separated by distillation.

Figure 6:
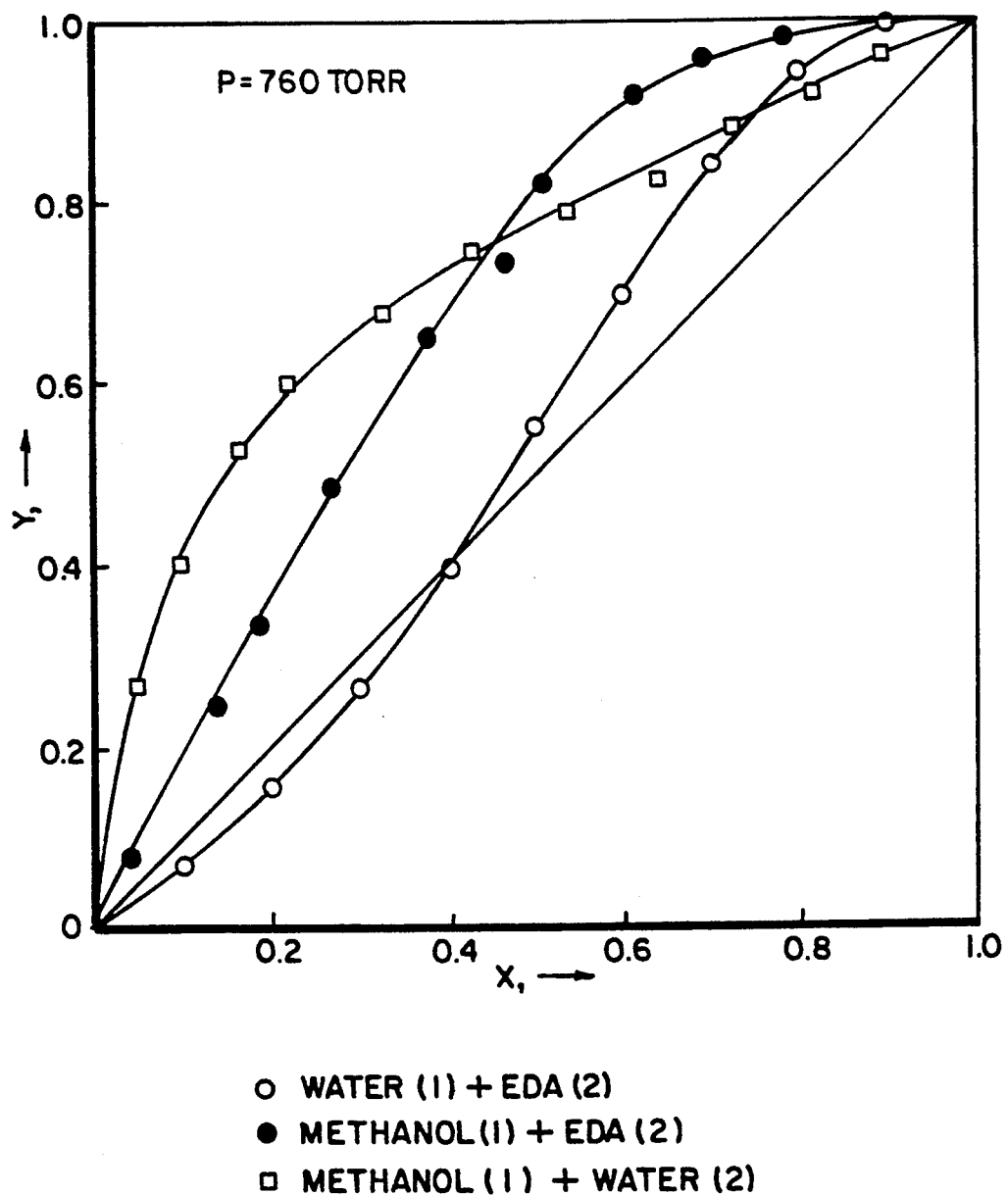
FIG. 6 is a vapor-liquid equilibrium diagram for various azeotropic and other liquid mixtures.

Another example of the embodiment depicted in FIG. 4 wherein the order of adsorptivity is A>D>B is the separation of ethylene diamine (EDA)+water mixture which forms an azeotrope at a composition of 40.0 mole % water in the liquid phase. FIG. 6 shows the vapor-liquid equilibrium diagram for this mixture at 1.0 atmosphere. Water (A) can be separated from EDA (B) by selective adsorption on 3A zeolite using methanol (D) as the desorbent. Furthermore, water (A)+methanol (D) and EDA (B)+methanol (D) mixtures can be easily separated by distillation due to their favorable vapor-liquid equilibrium characteristics as depicted in FIG. 6).

A third embodiment of this invention pertains to the separation of a feedstock containing at least a binary mixture wherein the selectivity of component (A), component (B) and desorbent (D) are in the order of A>B≧D with respect to the adsorbent.

Figure 7:
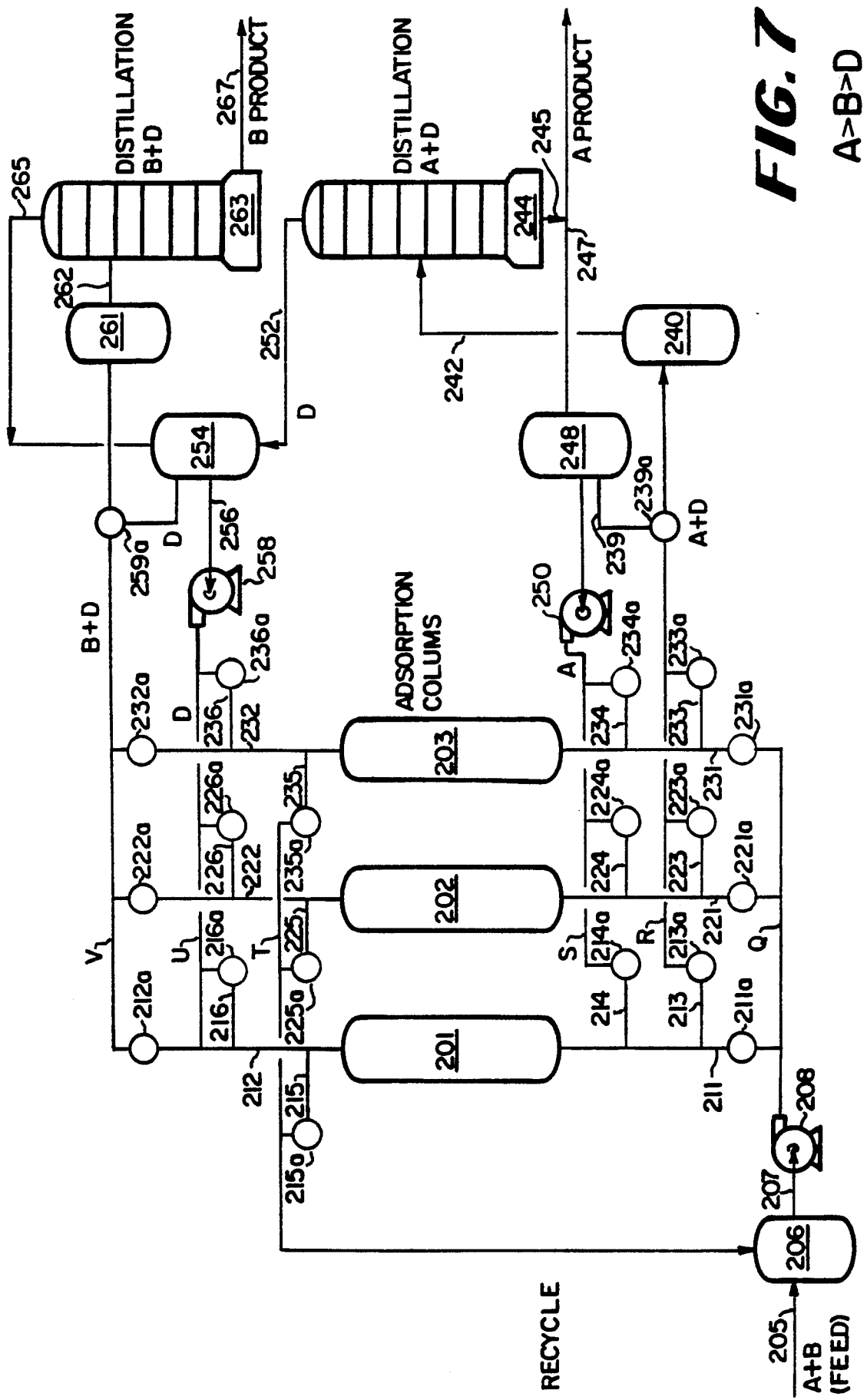
FIG. 7 is a process flow diagram of an embodiment utilizing three adsorption columns operated in cycle in a predetermined sequence.

FIG. 7 shows a schematic flow sheet for the CSA process which consists of three parallel adsorption column 201, 202 and 203; numerous switch valves, liquid manifolds Q through V, inclusive, liquid pumps 208, 250 and 258; mixing tanks 206, 240, 248, 254 and 261; and distillation columns 244 and 263. Multicomponent feedstock is drawn through line 205 into storage vessel 206 and through lines 207 by liquid pump 208 wherein the feedstock is introduced into a selected one of the adsorption columns 201, 202 or 203 via manifold Q. Manifold Q is operatively connected to lines 211, 221 and 231 which are connected to the inlet ends of adsorption columns 201, 202 and 203. Each of these branch inlet lines is equipped with a valve 211a, 221a and 231a, respectively. Opening of the appropriate valve permits flow of feedstock into the selected adsorption column being initially placed on stream. Thus, by opening valve 211a, while valves 221a and 231a are closed, feedstock is caused to flow from manifold Q through line 211 and into adsorption column 201.

Each of adsorption columns 201, 202 and 203 is further provided at their respective outlet ends with outlet lines 212, 222 and 232, respectively, each further equipped with control valves 212a, 222a and 232a, respectively. Lines 212, 222 and 232 are operatively connected to manifold V through which a mixture of component (B) and desorbent (D) passes for use in another process step. By opening the appropriate valve 212a, 222a, or 232a, a mixture of component (B) and desorbent (D) is caused to flow from the corresponding column through the connecting line and into manifold V to be stored in storage tank 261 and separated via distillation column 263 into a stream enriched in component (B) and a stream enriched in desorbent (D).

Each of lines 211, 221 and 231 are further fitted with line 213, 223 and 233, each being further provided with control valves 213a, 223a and 233a, respectively, such lines being in flow communication with manifold R. By opening the appropriate valve 213a, 223a or 233a, discharge liquid is allowed to exit the column through the connecting line in which the opened valve is located. Manifold R is operatively connected to storage tanks 240 and 248. The liquid stored in storage tank 240 provides feed for distillation column 244 via line 242. By opening valve 238a, liquid is caused to flow from manifold R through line 239 into storage tank 248.

Each adsorption column is placed in flow communication with discharge manifold S via lines 214, 224 and 234, each which is equipped with control valves 214a, 224a and 234a, respectively. By opening the appropriate valve 214a, 224a, or 234a, liquid from storage tank 248 is pumped via pump 250 through, manifold S and lines 214, 224 or 234 into the inlet end of column 201, 202 or 203, respectively.

Each adsorption column is placed in flow communication with manifold T via lines 215, 225 and 235 which are each fitted with control valves 215a, 225a and 235a. By opening the appropriate control valve 215a, 225a or 235a, liquid from the discharge end of the respective adsorption columns is caused to pass through lines 215, 225 or 235 into manifold T. Manifold T is in flow communication with storage vessel 206 wherein the effluent is mixed with additional feedstock containing a mixture of components (A) and (B).

Each adsorption column is operatively connected to manifold U via lines 216, 226 and 236, respectively, each of which is fitted with control valves 216a, 226a and 236a. By opening the appropriate control valve 216a, 226a or 236a, liquid from manifold U is caused to flow through lines 216, 226 and 236 into each respective adsorption column. Storage tank 254 receives a product of distillation column 263 via line 265; a product of distillation column 244 via line 252; and the effluent stream of manifold V when control valve 259a is placed in the open position to direct flow to tank 254. Desorbent (D) from storage tank 254 is pumped through line 256 via pump 258 and into adsorption column 201, 202 or 203 when control valve 216a, 226a or 236a is placed in the open position.

The embodiment represented in FIG. 7 will now be explained in connection with an arbitrarily chosen cycle having three separation periods of five minutes per period as set forth in Table 5. Although not limited thereto, the process as illustrated in FIG. 7, requires 3 adsorption columns for continuous operation. However, other arrangements using fewer adsorption columns may be employed if interrupted or discontinuous operation (using idling) of pumps is acceptable. Other arrangements may also be employed (e.g., employing more than four adsorption columns by appropriate sequencing of the individual steps of the process cycle).

TABLE 5

| Time | Column 1 | Column 2 | Column 3 |
|---|---|---|---|
| 0–t1 | Adsorption | D-Rinse | A-Rinse |
| t1–t2 | A-Rinse | Adsorption | D-Rinse |
| t2–t3 | D-Rinse | A-Rinse | Adsorption |

Each of the respective adsorption columns 201 through 203 undergoes one period of the adsorption step, one period of the (A)-rinse step and one period of the (D)-rinse step. As illustrated in Table 5, the steps undertaken at startup in each of adsorption columns 201 through 203 are staggered to enable at least one of the three adsorption columns to undergo the adsorption step at all times during the process cycle. A continuous process is achieved by the cyclic operation of the following steps in sequence:

(a) Adsorption—a fluid mixture containing components (A) and (B) is passed through each adsorption column containing an adsorbent which has been previously saturated with desorbent (D). Component (A) is selectively adsorbed whereas the leading edge of the MTZ consists of a mixture of component (B) and desorbent (D). The effluent from the column is initially very rich in desorbent (D) which is stored in a tank for use in the process. Thereafter, the effluent contains a mixture of component (B) and desorbent (D) which is mixed in a tank and then fed to a distillation column for separation of component (B) and desorbent (D). The separated desorbent (D) is sent to a storage tank containing the initial portion of the desorbent (D) effluent. The B-rich distillation product is withdrawn from the process as a product stream. This step is carried about until the adsorption column is essentially saturated with the feed mixture.

(b) A-Rinse—At the end of step (a) the adsorption column is co-currently rinsed with an (A)-rich liquid stream until the column is essentially saturated with component (A) of the feedstock mixture. The effluent from the column during this step is a feed-like mixture (A+B) which is recycled as feedstock by mixing with fresh feedstock.

(c) D-Rinse—At the end of step (b), the adsorbent within the adsorption column is countercurrently rinsed with a stream of desorbent (D). The effluent is initially very rich in component (A) and may be stored for use in step (b). Thereafter, the effluent becomes a mixture of (A+D) which is mixed in a tank and separated by distillation to produce a stream of desorbent (D) and an (A)-product which is partly withdrawn as (A) product and partly recycled as (A)-rich stream in step (b). The column is saturated with desorbent (D) at the end of this step and a new cycle begins with step (a).

The valve positions during the above-mentioned operating cycle are set forth in Table 6. The designation O indicates that the valve is open while a C represented a closed valve. The operative sequence of steps occurring in adsorption column 201 will now be described in exhaustive detail so that operation of a continuous process will be fully understood. The identical sequence of steps according to Table 5 occurs in staggered sequence in adsorption columns 202 and 203.

TABLE 6

| Valve | Valve Operation Schedule | | |
|---|---|---|---|
| | 0–t1 | t1–t2 | t2–t3 |
| 212a | O | C | C |
| 213a | C | C | O |
| 214a | C | O | C |
| 215a | C | O | C |
| 216a | C | C | O |
| 217a | O | C | C |
| 222a | C | O | C |
| 223a | O | C | C |
| 224a | C | C | O |
| 225a | C | C | O |
| 226a | O | C | C |
| 227a | C | O | C |
| 232a | C | C | O |
| 233a | C | O | C |
| 234a | O | C | C |
| 235a | O | C | C |
| 236a | C | O | C |
| 237a | C | C | O |
| 249a | C | C | C |
| 259a | C | C | C |

Again, referring to the embodiment disclosed in FIG. 7 and the sequence periods and valve positions designated in Table 5 and 6, adsorption column 201 undergoes one timed sequence period of the adsorption step. Feedstock is introduced into adsorption column 201 by opening valves 211a and 212a and closing valves 213a, 214a, 215a and 216a thereby allowing feedstock to be pumped from storage tank 206 through line 207 via pump 208 through manifold Q and line 211 into adsorption column 201 which contains an adsorbent preferentially selective toward retention of the more adsorbable component (A). The step is continued until the adsorption column is essentially saturated with the feed mixture. Component (A) is selectively adsorbed onto the adsorbent and a mass transfer zone (MTZ) is formed inside the adsorption column which moves toward the effluent end of the column as more feedstock is passed. The less selectively adsorbed components exit the discharge end of column 201 via line 212 and flow into manifold V. The effluent from the column is initially very rich in desorbent (D). The initial (D)-rich fraction is passed into storage tank 254 by opening control valve 259a. The liquid stored in tank 254 is mixed with a (D)-rich distillation product from distillation column 263 and the (D)-rich distillation product from column 244. The latter part of the column effluent for this step contains a mixture of component (B) and desorbent (D) which is fed into storage tank 261 and into distillation column 263 for separation of component (B) and desorbent (D). One product of distillation column 263 is collected as (B) product via line 267.

At the end of the adsorption step, Column 201 is rinsed with a liquid stream which is very rich in component (A). More particularly, valves 214a and 215a are opened enabling a rinse stream rich in component (A), stored in storage vessel 248, to be pumped via pump 250 through manifold S and lines 214 and 211 wherein the (A)-rich stream flows in a direction co-current to the flow of feedstock through the adsorbent. The (A)-rich product stored in storage tank 248 is one of the products of the distillation of component (A) and desorbent (D) which is effected in distillation column 244. This step is continued until adsorption column 201 is essentially saturated with (A)-rich liquid. The effluent from column 201 has a feed-like composition (A+B) which is passed through line 215 and manifold T to be collected and mixed with feedstock in storage vessel 206.

The final step in the cycle involves rinsing column 201 with desorbent (D). control valves 213a and 216a are opened and the (D)-rich stream is pumped from storage vessel 254 via pump 258 and flows through lines 256, manifold U, line 216 and line 212 into column 201 in a direction counter-current to flow of feedstock. The initial portion of the effluent during this step is an (A)-rich stream which may be directly withdrawn as product without distillation by passing the liquid into storage vessel 248 as product by appropriately opening 3-way valve 239a and passing the (A)-rich product through line 239 into storage tank 248. The latter portion of the effluent becomes a mixture of component (A) and desorbent (D) which is withdrawn from the inlet end of column 201 and passed through lines 211 and 213 and manifold R into storage tank 240. The contents of tank 240 provides feed for distillation column 244 wherein one of the distillation products is an (A)-rich stream which is collected as product via lines 245 and 247 and the other product is a purified (D)-rich stream which is routed to storage vessel 254 via line 252 for future use in the process. It is also possible to carry out this step by flowing the desorbent (D) through the adsorption column in a direction co-current to that of feed flow by appropriate valving.

The process proceeds according to the above-mentioned steps enumerated in Table 5. While the sequence periods are depicted as being of equal length, this is neither required or necessary. The times will be set by allowable maximum liquid flow rates and economic valve and line sizes.

The effluent during steps (a) and (c) which are separated by distillation have varied compositions of components (B+D) and (A+D), respectively, over time. Each effluent stream can be mixed to form a single liquid mixture of (B+D) or (A+D) and fed into a single tray of distillation columns 263 and 244, respectively. Alternatively, these mixtures can be mixed in parts to form several fractions of (B+D) and (A+D) which are fed into distillation columns at different trays. The later approach is preferred.

The above-described 3-step embodiment can be practiced using one or more columns. The three column configuration depicted in FIG. 7 is merely one representative example. The liquid pumps compress the liquids to overcome the pressure drop within each column. An alternative mode (not shown) of operating the embodiment described in FIG. 7 provides a simplified operating schedule. In this case, the (B+D) effluent produced during step (a) of the embodiment is not separated by distillation. The mixture forms one product from the process. This is useful when a liquid mixture (A+B) must to be separated to produce an (A)-rich product and a (B)-rich product and then the (B)-rich product is reacted with a third component (D) down stream. The schematic of FIG. 7 shows that if the third component can be used as the desorbent liquid (D), then distillation column 263 can be eliminated. This embodiment is available when the adsorptivity of component (A) and (B) with respect to the adsorbent are in the order of A>B>/<D.

An example of application of the embodiment disclosed in FIG. 7 is the separation of a feedstock containing ethylenediamine (EDA) and water which forms an azeotrope at 40.0 mole % H$_2$O concentration in the liquid phase. The adsorbent is preferably an A-type zeolite, preferably a 3A zeolite. Monoethanolamine (MEA) can be used as the desorbent liquid (D) which is less selectively adsorbed than EDA (component B) on 3A zeolite.

Figure 8:
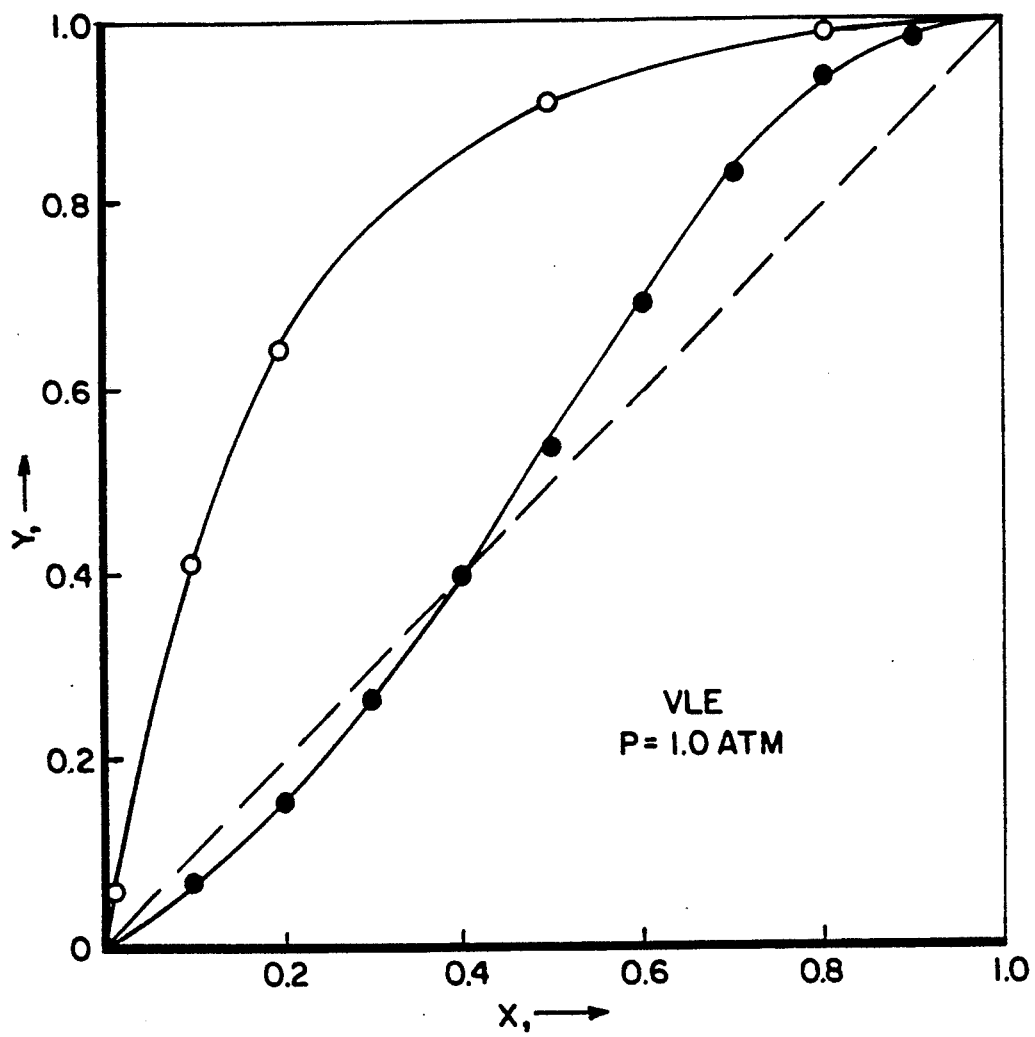
FIG. 8 is a vapor-liquid equilibrium diagram for various azeotropic and other liquid mixtures.

FIG. 8 shows the vapor-liquid equilibrium diagram for EDA—water and water—MEA mixtures. The liquid phase mole frame ($x_1$) of component 1 is plotted against its vapor phase composition ($y_1$) at 1.0 atmospheric total pressure. The separation of water and MEA by distillation is easily accomplished due to the large relative volatilities between these components.

Figure 9:
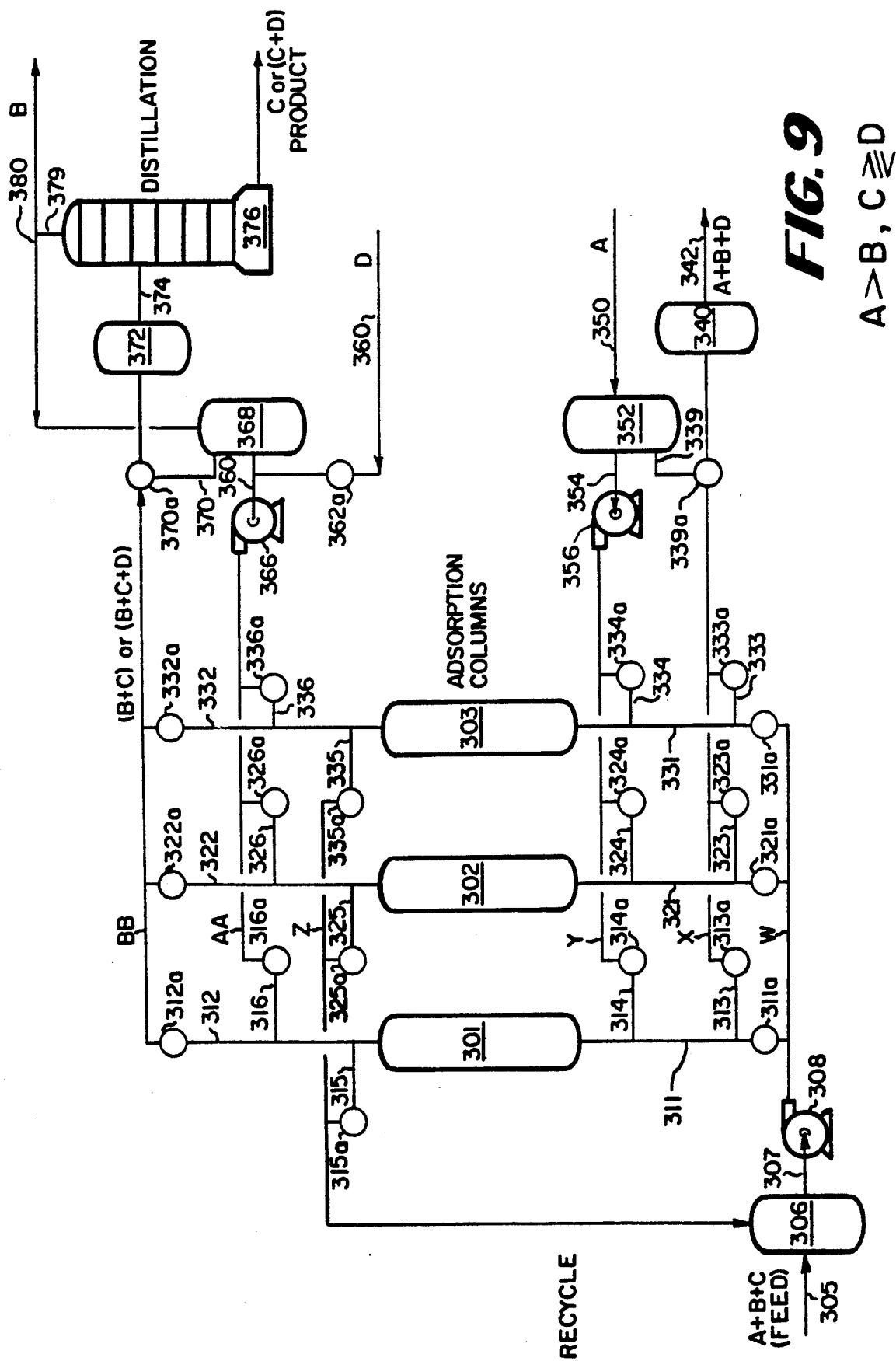
FIG. 9 is a process flow diagram of an embodiment utilizing three adsorption columns operated in cycle in a predetermined sequence.

Another embodiment of the present invention is shown in FIG. 9. In this embodiment a feed mixture containing the components (A+B+C) is separated to produce a (B)-rich product, a (C)-rich product or a product containing an admixture of (C) and (D) and an admixture of (A+B+D) wherein component (D) is the desorbent. The relative adsorptivity with respect to the adsorbent is A>B>C>/<D. Under some conditions the component (C) can also be used as the desorbent. Component (A) is selectively adsorbed during the adsorption step and a stream containing a mixture of components (B), (C) and (D) is produced as the column effluent. This effluent mixture is separated by distillation to produce a (B)-rich product and a (C)+(D)-rich product. The effluent (A+B+C) mixture produced during the (A)-rinse step is recycled as feedstock and the effluent formed during the (D)-rinse step is an admixture of component (A) and (D) or an admixture of component (A), component (B) and desorbent (D). Only one distillation column is used in this embodiment. Desorbent, (D) may be removed from the adsorption column at the end of the (D)-rinse step by rinsing the column with component (B) or component (C) produced as distillation products. This rinse step will prevent contamination of the product streams comprising components (B) and component (C), respectively, by desorbent (D). This extra step is not necessary when component (C) is the desorbent.

The embodiment of FIG. 9 consists of three parallel adsorption column 301, 302 and 303; numerous switch valves, liquid manifolds W through Z, inclusive and AA and BB, liquid pumps 308, 356 and 366; mixing tanks 306, 340, 352, 360 and 372; and distillation column 376. Feedstock containing components ((A), (B) and (C)) is drawn through line 305 into storage vessel 306 and through lines 307 by liquid pump 308 wherein the feedstock is introduced into a selected adsorption column 301, 302 or 303 via manifold W. Each of these branch inlet lines is equipped with a valve 311a, 321a and 331a, respectively. Opening of the appropriate valve permits flow of the feedstock into the selected adsorption column being initially placed on stream. Thus, by opening valve 311a, while valves 321a and 331a ar closed, feedstock is caused to flow from manifold W through line 311 and into adsorption column 301.

Each of adsorption columns 301, 302 and 303 is further provided at their respective outlet ends with outlet gas lines 312, 322 and 332, each further equipped with exit control valves 312a, 322a and 322a, respectively. Lines 312, 322 and 332 are operatively connected to a manifold BB through which a mixture of component (B) and component (C) or a mixture of (B+C+D) can be withdrawn. By opening the appropriate valve 312a, 322a, or 332a, a mixture of component (B) and component (C) or a mixture of (B+C+D) will flow from the corresponding column through the connecting line and into manifold BB to be stored in storage tank 372 and separated into a stream enriched in component (B) and a stream enriched in component (C) or component (C+D) in distillation column 376.

Each of lines 311, 321 and 331 is further fitted with line 313, 323 and 333, each being further provided with exit control valves 313a, 323a and 333a, respectively, such lines being in flow communication with manifold X. By opening the appropriate valve 313a, 323a or 333a, discharge liquid is allowed to exit the column through the connecting line in which the opened valve is located. Manifold X is operatively connected to storage tank 340. The liquid stored in storage tank 340 is a mixture of component (A) and component (D) or a mixture of component (A), component (B) and desorbent (D) which can be used as an additional process stream.

Each adsorption column is placed in flow communication with discharge manifold Y via lines 314, 324 and 334, each of which is equipped with exit control valves 314a, 324a and 334a. By opening the appropriate valve 314a, 324a, or 334a liquid from storage tank 352 is drawn through line 354 and manifold Y via pump 356 into the designated adsorption column.

Each adsorption column is placed in flow communication with manifold Z via lines 315, 325 and 335 which are each fitted with control valves 315a, 325a and 335a. By opening the appropriate control valve 315a, 325a or 335a, liquid from the discharge end of each respective adsorption column is caused to pass through lines 315, 325 or 335 into manifold Z. Manifold Z is in flow communication with storage vessel 306 wherein the effluent is mixed with additional feedstock (A+B+C).

Each adsorption column is operatively connected to manifold AA via lines 316, 326 and 336, respectively, each of which is fitted with control valves 316a, 326a and 336a. By opening the appropriate control valve 316a, 326a or 336a, liquid from storage tank 368 is caused to be pumped through manifold AA via pump 366, through lines 316, 326 or 336 and into adsorption column 301 302 or 303, respectively.

The embodiment represented in FIG. 9 will now be explained in connection with an arbitrarily chosen cycle having three timed separation periods of five minutes per period as set forth in Table 7. Although not limited hereto, the process as illustrated in FIG. 9 requires 3 adsorption columns for continuous operation. However, other arrangements using fewer adsorption columns may be employed if interrupted or discontinuous operation (using idling) of pumps is acceptable. Other arrangements may also be employed (e.g., employing more than four adsorption columns by appropriate sequencing of the individual steps of the process cycle.

TABLE 7

| Time  | Column 1   | Column 2   | Column 3   |
|-------|------------|------------|------------|
| 0–t1  | Adsorption | D-Rinse    | A-Rinse    |
| t1–t2 | A-Rinse    | Adsorption | D-Rinse    |
| t2–t3 | D-Rinse    | A-Rinse    | Adsorption |

Each of the respective adsorption columns 301 through 303 undergoes one period of the adsorption step, one period of the (A)-rinse step and one period of the (D)-rinse step. As illustrated in Table 7, the steps undertaken at startup in each of adsorption columns 301 through 303 are staggered to enable at least one of the three adsorption columns to undergo the adsorption step at all times during the process cycle. A continuous process is achieved by the cyclic operation of the following steps in timed sequence:

(a) Adsorption—a fluid mixture containing components (A), (B) and (C) is passed through each adsorption column containing an adsorbent which has been previously saturated with desorbent (D). Component (A) is selectively adsorbed onto the adsorbent. The effluent mixture (B+C+D) is mixed in a tank and then feed to a distillation column for separation into component (B) and a mixture of components (C) and (D). This step is continued until the adsorption column is essentially saturated with the feed mixture.

(b) A-Rinse—At the end of step (a) the adsorption column is co-currently rinsed with an (A)-rich liquid stream until the column is essentially saturated with component (A). The column effluent during this step is a feed-like mixture (A+B+C) which is recycled.

(c) D-Rinse—At the end of step (b), the adsorbent within the adsorption column is countercurrently rinsed with a stream of desorbent (D). The effluent is initially very rich in component (A) and is stored for use in step (b). Thereafter, the effluent composition becomes a mixture of (A+D) which may be mixed in a tank and separated by distillation to produce a desorbent (D) product which is sent to a storage tank and an (A)-product which is partly withdrawn as (A) product and partly recycled as an (A)-rich stream. The adsorption column is saturated with desorbent (D) at the end of this step and a new cycle begins with step (a).

The valve positions during the above-mentioned operating cycle are set forth in Table 8. The designation O indicates that the valve is open while a C represented a closed valve. The operative sequence of steps occurring in adsorption column 301 will now be described in exhaustive detail so that operation of a continuous process will be fully understood. The identical sequence of steps according to Table 7 occurs in staggered sequence in adsorption columns 302 and 303.

TABLE 8

| Valve | Valve Operation Schedule | | |
|-------|------|-------|-------|
|       | 0–t1 | t1–t2 | t2–t3 |
| 312a  | O    | C     | C     |
| 313a  | C    | C     | O     |
| 314a  | C    | O     | C     |
| 315a  | C    | O     | C     |
| 316a  | C    | C     | O     |
| 317a  | O    | C     | C     |
| 322a  | C    | O     | C     |
| 323a  | O    | C     | C     |
| 324a  | C    | C     | O     |
| 325a  | C    | C     | O     |
| 326a  | O    | C     | C     |
| 327a  | C    | O     | C     |
| 332a  | C    | C     | O     |
| 333a  | C    | O     | C     |
| 334a  | O    | C     | C     |
| 335a  | O    | C     | C     |
| 336a  | C    | O     | C     |
| 337a  | C    | C     | O     |
| 338a  | C    | C     | C     |

Again, referring to the embodiment disclosed in FIG. 9 and the timed sequence periods and valve positions designated in Tables 7 and 8, adsorption column 301 undergoes one timed sequence period of the adsorption step. Multicomponent feedstock is introduced into adsorption column 301 by opening valves 311a and 312a and closing valves 313a, 314a, 315a, and 316a thereby allowing feedstock (components (A)+(B)+(C)) to be pumped from storage tank 306 through line 307 via pump 308 through manifold X, line 311 and into adsorption column 301 which contains an adsorbent preferentially selective toward retention of component (A). The step is continued until the column is essentially saturated with the feed mixture. Component (A) is selectively adsorbed onto the adsorbent and a MTZ is formed inside the adsorption column which moves toward the effluent end of the column as more feed liquid is passed. The less selectively adsorbed components (B) and (C) exit the discharge end of column 301 via line 312 and flow into manifold BB. Initially, the effluent is rich in component (D) and is collected in storage tank 368 by appropriately positioning 3-way valve 370a wherein liquid flows through line 370 into storage tank 372. The composition of the effluent then becomes a mixture of component (B) and component (C) and a minor amount of component (D) wherein the mixture is passed through manifold BB and into storage tank 372. The liquid stored in tank 372 provides feed liquid for distillation column 376 via line 374. Distillation column 376 separates the mixture of components (B), (C) and (D) into products consisting of component (B) and a mixture of components (C) and (D). The B-rich product exits column 376 and partly flows through lines 379 and 380 into storage tank 368 and is partly withdrawn as the B-rich product.

At the end of the adsorption step, Column 301 is rinsed with a liquid stream which is very rich in component (A). More particularly, valves 314a and 315a are opened enabling a rinse stream rich in component (A), stored in storage vessel 352, to be pumped via pump 356 through line 350, line 354, manifold Y and lines 314 and 311 wherein the (A)-rich stream flows co-current to the direction of the flow of feedstock through column 301. The (A)-rich product stored in storage tank 352 can be drawn from an external tank (not shown) or diverted from another process as will be readily understood by those skilled in the art. The adsorption column effluent is a feed-like mixture (A+B+C) which is recycled through manifold Z into storage tank 306 to be mixed with fresh feedstock. This step is continued until adsorption column 301 is essentially saturated with (A)-rich liquid.

The final step in the cycle involved rinsing column 301 with desorbent (D). Control valves 316a, 313a and 362a are opened and the (D)-rich stream is pumped from storage vessel (368) or another process stream (not shown) via pump 366 and brought through line 360, manifold AA, line 316 and line 312 into the discharge end of adsorption column 301 in a direction countercurrent to the feedstock. Initially, the column effluent is an (A)-rich stream which is collected in storage tank 352 by opening three-way valve 339a allowing the (A)-rich stream to pass through manifold X into line 339 and into storage tank 352. The effluent composition becomes a mixture of component (A) and desorbent (D) with or without a minor amount of component (B) which is withdrawn from the inlet end of column 301, passing through lines 311 and 313 and manifold X to be collected as product in storage tank 340.

The process proceeds according to the above-mentioned steps enumerated in Table 7. While the timed sequence periods are depicted as being of equal length, this is neither required or necessary. The times will be set by allowable maximum liquid flow rates and economic valve and line sizes.

The above-described embodiment can be practiced using one or more columns. The three column configuration of FIG. 9 is just one example suitable for practicing this embodiment. The liquid pumps compress the liquids to overcome the pressure drop in each adsorption column.

An application of the embodiment described in FIG. 9 is the removal of methanol (A) from a stream containing a mixture of methyl tert-butyl ether, (MTBE) (B) and $C_4$ hydrocarbons (C) by selective adsorption of methanol on 4A zeolite. This stream is produced during production of MTBE by reacting iso-$C_4$ olefins and methanol. The more selectively adsorbable component (A) is methanol; the less selectively adsorbable component (B) is MTBE; and component (C) is a mixture of linear and branched $C_4$ hydrocarbons. MTBE and methanol forms an azeotrope and the resulting mixture is difficult to separate by distillation. The embodiment disclosed in FIG. 9 can be used to separate this mixture to produce a MTBE+$C_4$ iso- and normal alkane stream as the adsorbent effluent which can then be separated by distillation. The fresh hydrocarbon feed to the MTBE reactor can be used as the desorbent (D) liquid so that the effluent of the (D)-rinse step is methanol+-fresh hydrocarbon feed which can be sent to the MTBE reactor. A rinse with $C_4$-alkane distillation product after the (D)-rinse step may be needed to prevent contamination of iso-$C_4$ olefinic compounds in the iso-normal $C_4$-alkane and MTBE products produced during the adsorption step.

The process of the present invention provides an energy efficient continuous process for the separation of liquid mixtures which are typically difficult to separate using conventional techniques.

Having thus described the present invention, what is now deeded appropriate for Letters Patent is set forth in the following appended claims.

What is claimed is:

1. A process for separating a liquid feedstock comprising a more adsorbable component (A) and a less adsorbable component (B) wherein the relative adsorptivity of component (A), component (B) and a desorbent liquid (D) with respect to an adsorbent is in the order $D>A>B$ in a system comprising a plurality of adsorption columns operated in cycle in a predetermined timed sequence, each adsorption column containing an adsorbent, which process comprises the following sequence of operational steps performed in the order recited in each of the adsorption columns in its turn:

(a) passing the feedstock through the adsorption column and selectively adsorbing the more adsorbable component (A) while discharging a stream enriched in component (B);

(b) rinsing the adsorption column in a direction co-current to the feedstock with the more adsorbable component (A) whereby the less adsorbable component (B) is displaced from the adsorption column and withdrawing a stream comprising a mixture of the more adsorbable component (A) and the less adsorbable component (B) from the adsorption column;

(c) rinsing the adsorption column with a liquid desorbent (D) whereby the more adsorbable component (A) and the less adsorbable component (B) are displaced from the adsorbent bed and withdrawing a stream enriched in component (A) from the adsorption column; and (d) rinsing the adsorption column with component (B) whereby the desorbent liquid (D) is displaced from the adsorption column and withdrawing therefrom a stream comprising less adsorbable component (B) and desorbent liquid (D) wherein the more adsorbable component (A) is ethanol, the less adsorbable component (B) is water, the desorbent liquid (D) is acetone and the adsorbent is activated carbon; or the more adsorbable component (A) is acetic acid, the less adsorbable component (B) is water, the desorbent liquid (D) is acetone and the adsorbent is activated carbon.

2. The process according to claim 1 further comprising:

(e) separating the stream of step (c) comprising the more adsorbable component (A) and the desorbent (D) and utilizing a portion of the separated desorbent (D) as a source of desorbent (D) in step (c); and (f) separating the stream of step (d) comprising the less adsorbable component (B) and the desorbent liquid (D) and utilizing a portion of the separated desorbent (D) as a source of desorbent (D) in step (c).

3. The process according to claim 1 wherein step (b) further comprises recycling the effluent mixture of the more adsorbable component (A) and the less adsorbable component (B) for use as additional feedstock.

4. The process according to claim 2 wherein Step (b) further comprises utilizing a portion of the more adsorbable component (A) obtained following the separation of Step (e) as source of more adsorbable component (A).

5. The process according to claim 1 wherein the activated carbon adsorbent has a particle diameter ranging from about 0.2 to 0.8 millimeters.

6. The process according to claim 1 wherein the feedstock is compressed to a pressure ranging from about 10 to 150 psig.

7. A process for separating a liquid feedstock comprising a more adsorbable component (A) and a less adsorbable component (B) wherein the relative adsorptivity of component (A), component (B) and a desorbent liquid (D) with respect to an adsorbent is in the order $A > D > B$ in a system comprising a plurality of adsorption columns operated in cycle in a predetermined timed sequence, each adsorption column containing an adsorbent, which process comprises the following sequence of operational steps performed in the order recited in each of the adsorption columns in its turn:

(a) passing the feedstock through the adsorption column and selectively adsorbing the more adsorbable component (A) while discharging a stream enriched in component (B);

(b) rinsing the adsorption column in a direction cocurrent to the feedstock with the more adsorbable component (A) whereby the less adsorbable component (B) is displaced from the adsorption column and withdrawing therefrom a stream comprising a mixture of the more adsorbable component (A) and the less adsorbable component (B);

(c) rinsing the adsorption column with a liquid desorbent (D) whereby the less adsorbable component (B) is displaced from the adsorption column and withdrawing therefrom a stream comprising a mixture of the more adsorbable component (A) and the desorbent liquid (D); and (d) rinsing the adsorption column with component (B) whereby the desorbent liquid (D) is displaced from the adsorption column and withdrawing therefrom a stream comprising less adsorbable component (B) and desorbent liquid (D) wherein the more adsorbable component (A) is methanol, the less adsorbable component (B) is methyl acetate, the desorbent liquid (D) is ethanol and the adsorbent is NaX zeolite; or the more adsorbable component (A) is water, the less adsorbable component (B) is ethylenediamine, the desorbent liquid (D) is methanol and the adsorbent is 3A zeolite.

8. The process of claim 7 further comprising:

(e) separating the stream of step (c) comprising the more adsorbable component (A) and the desorbent liquid (D) and recycling a portion of the separated desorbent (D) for use as desorbent (D) in step (c); and (f) separating the stream of step (d) comprising the less adsorbable component (B) and the desorbent liquid (D) and recycling a portion of the separated desorbent (D) for use as desorbent (D) in step (c).

9. The process according to claim 7 wherein step (b) further comprises recycling the effluent mixture of the more adsorbable component (A) and the less adsorbable component (B) for use as additional feedstock.

10. The process according to claim 8 wherein Step (b) further comprises utilizing a portion of the more adsorbable component (A) obtained following the separation of Step (e) as source of more adsorbable component (A).

11. The process according to claim 7 wherein the adsorbent has a particle diameter ranging from about 0.2 to 0.8 millimeters.

12. The process according to claim 7 wherein the feedstock is compressed to a pressure ranging from about 10 to 150 psig.

13. A process for separating a liquid feedstock comprising a more adsorbable component (A) and a less adsorbable component (B) wherein the relative adsorptivity of component (A), component (B) and a desorbent liquid (D) with respect to an adsorbent is in the order $A > B > D$ in a system comprising a plurality of adsorption columns operated in cycle in a predetermined timed sequence, each adsorption column containing an adsorbent, which process comprises the following sequence of operational steps performed in the order recited in each of the adsorption columns in its turn:

(a) passing the feedstock through the adsorption column and selectively adsorbing the more adsorbable component (A) while discharging a stream comprising a mixture of the less adsorbable component (B) and the desorbent liquid (D);

(b) rinsing the adsorption column in a direction cocurrent to the feedstock with the more adsorbable component (A) whereby the less adsorbable component (B) is displaced from the adsorption column and withdrawing therefrom a stream comprising a mixture of the more adsorbable component (A) and the less adsorbable component (B); and (c) rinsing the adsorption column with a liquid desorbent (D) whereby the more adsorbable component (A) is displaced from the adsorption column and withdrawing therefrom a stream comprising a mixture of component (A) and desorbent liquid (D); wherein the more adsorbable component (A) is water, the less adsorbable component (B) is ethylenediamine, the desorbent liquid (D) is monoethanolamine and the adsorbent is an A-zeolite.

14. The process according to claim 13 further comprising:
(d) separating the stream of step (a) comprising the less adsorbable component (B) and the desorbent liquid (D) and recycling a portion of the separated desorbent (D) for use as desorbent (D) in step (c); and
(e) separating the stream of step (c) comprising the more adsorbable component (A) and the desorbent liquid (D) and recycling a portion of the separated desorbent (D) for use as desorbent (D) in step (c).

15. The process according to claim 13 wherein step (b) further comprises recycling the effluent mixture of the more adsorbable component (A) and the less adsorbable component (B) for use as additional feedstock.

16. The process according to claim 13 wherein the A-zeolite is a 3A zeolite.

17. The process according to claim 16 wherein the 3A zeolite has a particle diameter ranging from about 0.2 to 0.8 millimeters.

18. The process according to claim 13 wherein the feedstock is compressed to a pressure ranging from about 10 to 150 psig.

* * * * *

UNITED STATES PATENT AND TRADEMARK OFFICE
CERTIFICATE OF CORRECTION

PATENT NO. : 5,026,482
DATED : June 25, 1991
INVENTOR(S) : Sircar

It is certified that error appears in the above-identified patent and that said Letters Patent is hereby corrected as shown below:

Column 1, line 44, delete "while" and insert -- which --.

Column 5, line 25, delete "A > B and A > C" and insert -- A > B > C > /< D --.

Column 8, line 57, delete "optical" and insert -- optional --

Column 9, line 32, delete "is" and insert -- as --.

Column 10, line 36, delete "product" and insert -- produce --

Column 12, line 41, delete "co-counter" and insert -- co-current --.

Column 13, line 21, delete "0.1" and insert -- 1.0 --.

Column 14, line 58, delete "165" and insert -- 166 --.

Column 15, line 28, delete "provided" and insert -- provides --.

Column 16, line 10, delete "or" and insert -- of --.

Column 17, line 34, delete "117 a" and insert -- 117a --.

Column 17, line 53, delete "152" and insert -- 162 --.

Column 20, line 28, delete "238a" and insert -- 239a --.

Column 24, line 7, delete "frame" and insert -- fraction --.

Column 24, line 54, delete "ar" and insert -- are --.

Column 24, line 60, between "and" and "respectively", delete "322a" and insert -- 332a --.

Column 25, line 44, delete "hereto" and insert -- thereto --.

UNITED STATES PATENT AND TRADEMARK OFFICE
CERTIFICATE OF CORRECTION

PATENT NO. : 5,026,482

DATED : June 25, 1991

INVENTOR(S) : Sircar

It is certified that error appears in the above-identified patent and that said Letters Patent is hereby corrected as shown below:

Column 27, line 42, delete "involved" and insert -- involves --.

Signed and Sealed this

Third Day of November, 1992

Attest:

DOUGLAS B. COMER

*Attesting Officer*

*Acting Commissioner of Patents and Trademarks*